United States Patent
Onose et al.

(10) Patent No.: US 8,634,441 B2
(45) Date of Patent: Jan. 21, 2014

(54) MASTER OSCILLATOR, LASER SYSTEM, AND LASER LIGHT GENERATION METHOD

(75) Inventors: Takashi Onose, Oyama (JP); Shinji Ito, Oyama (JP)

(73) Assignee: Gigaphoton Inc., Oyama-shi (JP)

( * ) Notice: Subject to any disclaimer, the term of this patent is extended or adjusted under 35 U.S.C. 154(b) by 127 days.

(21) Appl. No.: 13/421,016

(22) Filed: Mar. 15, 2012

(65) Prior Publication Data

US 2012/0243565 A1  Sep. 27, 2012

(30) Foreign Application Priority Data

Mar. 22, 2011 (JP) ................... 2011-063150

(51) Int. Cl.
*H01S 3/10* (2006.01)

(52) U.S. Cl.
USPC ......... 372/25; 372/8; 372/21; 372/30; 372/69

(58) Field of Classification Search
USPC .......................................... 372/8, 21, 25, 30
See application file for complete search history.

(56) References Cited

U.S. PATENT DOCUMENTS

| | | | |
|---|---|---|---|
| 5,689,363 A | 11/1997 | Dane et al. | |
| 6,816,520 B1 | 11/2004 | Tulloch et al. | |
| 7,564,879 B2 | 7/2009 | Tanaka et al. | |
| 7,593,437 B2 | 9/2009 | Staroudoumov et al. | |
| 7,593,440 B2 | 9/2009 | Spinelli et al. | |
| 2005/0018723 A1 | 1/2005 | Morita et al. | |
| 2005/0271110 A1* | 12/2005 | Paetzel et al. | 372/65 |
| 2008/0267242 A1* | 10/2008 | Ershov et al. | 372/57 |
| 2009/0067468 A1 | 3/2009 | Brown et al. | |
| 2010/0220756 A1* | 9/2010 | Krzysztof et al. | 372/38.02 |

FOREIGN PATENT DOCUMENTS

| | | |
|---|---|---|
| JP | 09-214023 | 8/1997 |
| JP | 11-046025 | 2/1999 |
| JP | 2000-156535 | 6/2000 |
| JP | 2008-122785 | 5/2008 |

* cited by examiner

*Primary Examiner* — Dung Nguyen
(74) *Attorney, Agent, or Firm* — Hogan Lovells US LLP

(57) ABSTRACT

A master oscillator may include: a pumping laser that outputs pumping light; a seed laser that is oscillated by the pumping light; an amplifier that amplifies the pulsed laser light outputted by the seed laser using the pumping light; at least one optical shutter disposed in the optical path between the seed laser and the amplifier; and a controller that causes the pumping laser to oscillate continuously at a predetermined repetition rate and that controls the optical shutter to open and close.

7 Claims, 19 Drawing Sheets

MASTER OSCILLATOR, LASER SYSTEM, AND LASER LIGHT GENERATION METHOD

CROSS-REFERENCE TO RELATED APPLICATION

The present application claims priority from Japanese Patent Application No. 2011-063150 filed Mar. 22, 2011.

BACKGROUND

1. Technical Field

The present disclosure relates to master oscillators, laser systems, and laser light generation methods.

2. Related Art

Typical ultraviolet excimer lasers used in semiconductor lithography processes include a KrF excimer laser having a wavelength of approximately 248 nm and an ArF excimer laser having a wavelength of approximately 193 nm.

Most such ArF excimer lasers are supplied to market as two-stage laser systems that include an oscillation stage laser and an amplifier stage. A basic configuration that is common between the oscillation stage laser and the amplifier stage in a two-stage ArF excimer laser system will be described. The oscillation stage laser has a first chamber, whereas the amplifier stage has a second chamber. A laser gas (a mixed gas including $F_2$, Ar, Ne, and Xe) is confined in the respective first and second chambers. The oscillation stage laser and the amplifier stage also have power sources that supply electrical energy for pumping the laser gas. Separate power source may be provided for the oscillation stage laser and the amplifier stage, respectively, but a single power source can also be shared between the two. First discharge electrodes including a first anode and a first cathode that are both connected to the power source are provided within the first chamber. Similarly, second discharge electrodes including a second anode and a second cathode that are both connected to the power source are provided within the second chamber.

A configuration unique to the oscillation stage laser is, for example, a line narrowing module. A line narrowing module typically includes a single grating and at least one prism beam expander. An optical resonator is formed jointly by a semi-transparent mirror and the grating, and the first chamber of the oscillation stage laser is disposed between the semitransparent mirror and the grating.

When a discharge is generated between the first anode and the first cathode of the first discharge electrodes, the laser gas is pumped, and light is generated when the pumping energy is emitted. This light results in laser light whose wavelength has been selected by the line narrowing module, and the laser light is outputted from the oscillation stage laser.

A two-stage laser system in which the amplifier stage is a laser including a resonator structure is called "MOPO," whereas a two-stage laser system in which the amplifier stage is not a laser and no resonator structure is provided is called "MOPA." When the laser light from the oscillation stage laser is present within the second chamber of the amplifier stage, control is carried out so that a discharge is created between the second anode and the second cathode of the second discharge electrodes. Through this, the laser gas within the second chamber is pumped, and the laser light is outputted from the amplifier stage after being amplified.

SUMMARY

A master oscillator according to an aspect of this disclosure may include: a pumping laser that outputs pumping light; a seed laser that is oscillated by the pumping light; an amplifier that amplifies the pulsed laser light outputted by the seed laser using the pumping light; at least one optical shutter disposed in the optical path between the seed laser and the amplifier; and a controller that causes the pumping laser to oscillate continuously at a predetermined repetition rate and that controls the optical shutter to open and close.

A laser system according to another aspect of this disclosure may include a master oscillator that outputs pulsed laser light and an amplification device that amplifies the pulsed laser light outputted from the master oscillator; the master oscillator may have: a pumping laser that outputs pumping light; a seed laser that is oscillated by the pumping light; a second amplifier that amplifies the pulsed laser light outputted by the seed laser using the pumping light; at least one optical shutter disposed in the optical path between the seed laser and the second amplifier; and a controller that causes the pumping laser to oscillate continuously at a predetermined repetition rate and that controls the optical shutter to open and close.

A laser light generation method according to yet another aspect of this disclosure may be a laser light generation method for an apparatus that includes a pumping laser that outputs pumping light, a seed laser that is oscillated by the pumping light, an amplifier that amplifies the pulsed laser light outputted by the seed laser using the pumping light, and at least one optical shutter disposed in the optical path between the seed laser and the amplifier. The method may include continuously oscillating the pumping laser at a predetermined repetition rate, and generating a burst output of the pulsed laser light by controlling the optical shutters to open and close while the pumping laser is continuously oscillating.

BRIEF DESCRIPTION OF THE DRAWINGS

Embodiments of this disclosure will be described hereinafter with reference to the appended drawings.

DESCRIPTION OF PREFERRED EMBODIMENTS

Figure 1:
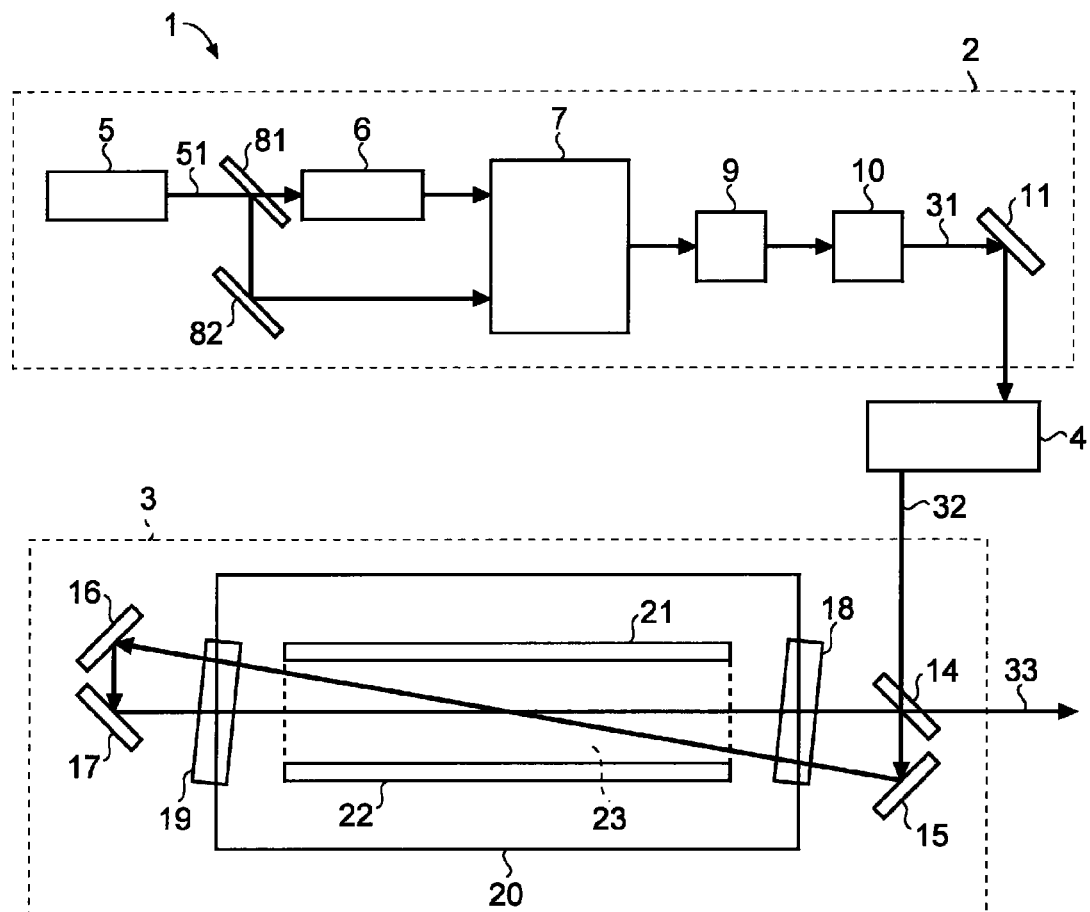
FIG. 1 schematically illustrates an example of a two-stage laser apparatus using a master oscillator having a wavelength conversion element according to a first embodiment of this disclosure.

Embodiments of this disclosure will be described in detail hereinafter with reference to the drawings. The embodiments described hereinafter indicate examples of this disclosure, and are not intended to limit the scope of this disclosure. Furthermore, not all of the configurations and operations described in the embodiments are requisite in this disclosure. Note that identical components will be given identical reference numerals, and duplicate descriptions thereof will be omitted. The embodiments of this disclosure will be described following the contents below.

1. Outline
2. Explanation of Terms
3. Laser System Including Master Oscillator Having Wavelength Conversion Element and Amplification Device (First Embodiment)
   3.1 Configuration
   3.2 Operations
   3.3 Burst Oscillation
4. Laser System Combining Master Oscillator Having Optical Shutter and Amplification Device (Second Embodiment)
   4.1 Configuration
      4.1.1 Master Oscillator Including Optical Shutter
      4.1.2 Optical Shutter (Combination of Pockels Cell and Polarizer)
   4.2 Operations
      4.2.1 Master Oscillator Timing Chart
      4.2.2 Laser System Flowchart
   4.3 Effects
5. Laser System Combining Master Oscillator Having Optical Shutter and Amplification Device (Third Embodiment)
   5.1 Configuration
   5.2 Operations
      5.2.1 Master Oscillator Timing Chart
      5.2.2 Laser System Flowchart
   5.3 Effects
6. Master Oscillator Provided with Optical Axis Control Device of Pumping Laser (Fourth Embodiment)
   6.1 Configuration
   6.2 Operations
   6.3 Effects
7. Additional Descriptions
   7.1 Ti: Sapphire Laser (Seed Laser)
   7.2 Amplifier (Power Amplifier: PA)
   7.3 Alternative Example of Amplifier (Amplifier Including Optical Resonator (Power Oscillator): PO)
   7.4 Optical Axis Control Mechanism
      7.4.1 Optical Axis Sensor (Configuration Example 1)
      7.4.2 Optical Axis Sensor (Configuration Example 2)
      7.4.3 Optical Axis Adjustment Unit (Two-Axis Tilt Stage Mirror)

1. Outline

According to the embodiments described as examples hereinafter, bursts of pulsed laser light outputted continuously at a predetermined repetition rate may be generated by opening/closing an optical shutter disposed inside a master oscillator.

2. Explanation of Terms

A "KBBF crystal" is a nonlinear optical crystal expressed by a chemical formula $KBe_2BO_3F_2$, and serves as a wavelength conversion element. "Burst oscillation" refers to outputting pulsed laser light at a predetermined repetition rate during a predetermined period. An "optical path" is a path along which laser light is transmitted.

3. Laser System Including Master Oscillator Having Wavelength Conversion Element and Amplification Device (First Embodiment)

3.1 Configuration

FIG. 1 schematically illustrates an example of a two-stage laser apparatus according to a first embodiment of this disclosure.

A two-stage laser apparatus (called a "laser system" hereinafter) 1 includes, broadly speaking, a master oscillator 2 and an amplification device 3. The master oscillator 2 may, for example, include a wavelength conversion element. The amplification device 3 may, for example, be a discharge-pumped ArF excimer amplifier. A low-coherence optical system 4 may be disposed between the master oscillator 2 and the amplification device 3. A system such as an optical pulse stretcher, a random phase plate, or the like may be employed as the low-coherence optical system 4.

The master oscillator 2 will be described next. The master oscillator 2 may include a pumping laser 5, a Ti: sapphire laser 6, an amplifier 7, a beam splitter 81, a high-reflection mirror 82, an LBO crystal 9, a KBBF crystal 10, and a high-reflection mirror 11.

The pumping laser 5 may be a laser that, for example, oscillates second harmonic light of a semiconductor laser-pumped Nd:YAG laser. The Ti:sapphire laser 6 may include a Ti:sapphire crystal and an optical resonator. The amplifier 7 may be an amplifier that includes a Ti:sapphire crystal.

The amplification device 3 will be described next. The amplification device 3 may include a chamber 20, a pair of discharge electrodes (an anode 21 and a cathode 22), an output coupler 14, and high-reflection mirrors 15, 16, and 17. A laser gas may be confined in the chamber 20. This laser gas may be a mixed gas of Ar, Ne, $F_2$, and Xe. The anode 21 and the cathode 22 may be disposed within the chamber 20. The anode 21 and the cathode 22 may be disposed in the vertical direction to the paper as illustrated in FIG. 1. The area between the anode 21 and the cathode 22 may be a discharge space 23. Windows 18 and 19, through which pulsed laser light 32 passes, may be provided in the chamber 20. In addition, a power source (not shown) may be disposed outside the chamber 20.

A ring optical resonator may be formed jointly by the output coupler 14 and the high-reflection mirrors 15, 16, and 17. The output coupler 14 may be an element that transmits a part of light and reflects another part of the light.

3.2 Operations

The master oscillator 2 may output pulsed laser light 31 having a wavelength of approximately 193 nm. The low-coherence optical system 4 may then reduce the coherence of the pulsed laser light 31. The amplification device 3 may amplify the pulsed laser light 32, whose coherence has been reduced, and output that light as pulsed laser light 33. The pulsed laser light 33 may, for example, be transmitted to a semiconductor exposure apparatus (not shown) and used in exposure processes.

Pumping light 51 having a wavelength of approximately 532 nm may be outputted from the pumping laser 5. Part of the pumping light 51 may pass through the beam splitter 81. Another part of the pumping light 51 may be reflected by the beam splitter 81. The pumping light 51 that has passed through the beam splitter 81 may pump the Ti:sapphire laser 6. Pulsed laser light having a wavelength of approximately 773.6 nm may be outputted from the pumped laser 6. Here, the Ti:sapphire laser 6 may include an optical resonator provided with a wavelength selection element (not shown). Pulsed laser light having a spectral width that has been narrowed by the wavelength selection element may be outputted from the Ti:sapphire laser 6.

Of the pumping light 51 outputted from the pumping laser 5, the pumping light 51 reflected by the beam splitter 81 may further be reflected by the high-reflection mirror 82. The reflected pumping light 51 may enter the Ti:sapphire amplifier 7 and may then pump the Ti:sapphire crystal provided therein. The amplifier 7 may amplify the pulsed laser light outputted from the Ti:sapphire laser 6 using that pumping energy. As a result, pulsed laser light having a wavelength of approximately 773.6 nm may be outputted from the amplifier 7.

The pulsed laser light outputted from the Ti:sapphire amplifier 7 may be converted into pulsed laser light having a wavelength of approximately 386.8 nm (half the aforementioned 773.6 nm) by passing through the LBO crystal 9, which serves as a wavelength conversion element. The pulsed laser light that has experienced the wavelength conversion may further be converted into pulsed laser light 31 having a wavelength of approximately 193.4 nm (half the aforementioned 386.8 nm) by passing through the KBBF crystal 10, which serves as another wavelength conversion element.

The travel direction of the pulsed laser light 31 that has passed through the KBBF crystal 10 may be changed by the high-reflection mirror 11, and the pulsed laser light 31 may enter the low-coherence optical system 4. The coherence of the pulsed laser light 31 may be reduced by passing through the low-coherence optical system 4. The pulsed laser light 32 whose coherence has been reduced may then enter the amplification device 3.

The power source electrically connected to the anode 21 and the cathode 22 in the chamber 20 may apply a potential difference between the anode 21 and the cathode 22. Through this, a discharge may occur between the anode 21 and the cathode 22 at the timing at which the pulsed laser light 32 passes through the discharge space 23 in the amplification device 3.

Part of the pulsed laser light 32 emitted by the low-coherence optical system 4 may pass through the output coupler 14 and be reflected by the high-reflection mirror 15. This pulsed laser light 32 may then pass through the window 18 and advance into the discharge space 23 between the anode 21 and the cathode 22. The pulsed laser light 32 may be amplified by carrying out control so that a discharge occurs in the discharge space 23 when the pulsed laser light 32 is present in the discharge space 23. The amplified pulsed laser light 32 may be emitted from the chamber 20 through the window 19. The emitted pulsed laser light 32 may be highly reflected by the high-reflection mirrors 16 and 17, and may then once again advance into the discharge space 23 within the chamber 20 via the window 19. This pulsed laser light 32 may then be emitted from the chamber 20 through the window 18. The emitted pulsed laser light 32 may then be incident on the output coupler 14. Part of the pulsed laser light 32 may pass through the output coupler 14 and be emitted from the amplification device 3 as the pulsed laser light 33. Another part of the pulsed laser light 32 may be returned to the ring optical resonator as feedback light by being reflected by the output coupler 14.

Although the amplification device 3 including a ring optical resonator is mentioned as an example in these descriptions, the scope of this disclosure is not limited thereto. For example, the amplification device 3 may include a Fabry-Perot resonator in which an optical resonator is provided in an amplifier.

3.3 Burst Oscillation

Figure 2:
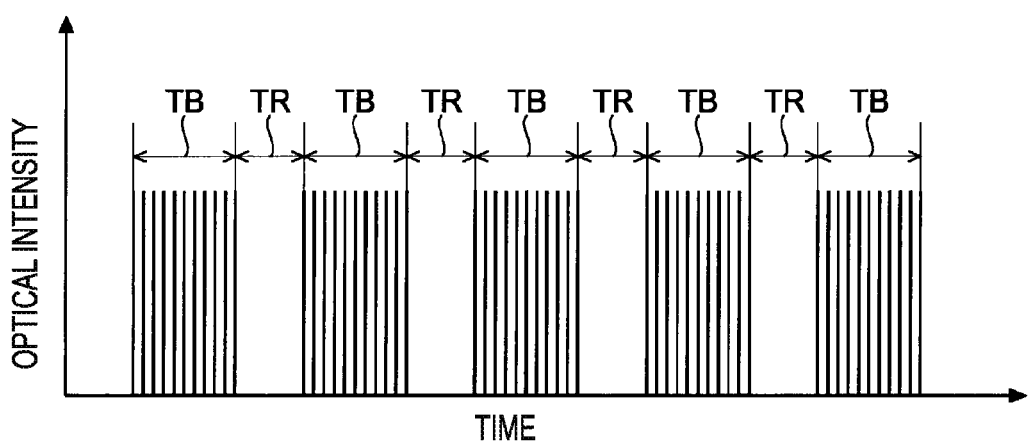
FIG. 2 is a timing chart illustrating driving operations performed by the laser system illustrated in FIG. 1.

FIG. 2 is a timing chart illustrating driving operations performed by the laser system 1. In exposure process using the laser system 1, a semiconductor wafer, for example, may be exposed using the pulsed laser light 33 of a predetermined repetition rate. However, the exposure by the pulsed laser light 33 may be stopped during, for example, periods in which, for example, the wafer is moved or replaced, or a mask is replaced in the exposure apparatus. In other words, as shown in FIG. 2, in exposure that is carried out using the laser system 1, a burst output period TB in which the pulsed laser light 33 is outputted to the exposure apparatus at a predetermined repetition rate and a burst rest period TR in which the output of the pulsed laser light 33 to the exposure apparatus is stopped may be repeated in an alternating manner.

Typically, it is believed that, in order for the laser system 1 to repeat the burst output period TB and the burst rest period TR in an alternating manner as described above, it is necessary for the master oscillator 2 to output the pulsed laser light 31 such that the burst output period TB and the burst rest period TR are repeated in an alternating manner.

However, if the master oscillator 2 is made to carry out such operations, there is a chance that the master oscillator 2 will become thermally unstable. It is believed that if the master oscillator 2 becomes thermally unstable, the beam diameter of the pulsed laser light 31 may fluctuate or the power may become unstable, so that it may become difficult to generate a stable pulsed laser light 31. It is further believed that, if the pulsed laser light 31 outputted by the master oscillator 2 is unstable, an unstable pulsed laser light 33 that has been amplified may be outputted from the amplification device 3 for amplifying the unstable pulsed laser light 31.

4. Laser System Combining Master Oscillator Having Optical Shutter and Amplification Device (Second Embodiment)

Next, another embodiment of the laser system will be described in detail, with reference to the drawings, as a second embodiment of this disclosure.

4.1 Configuration

Figure 3:
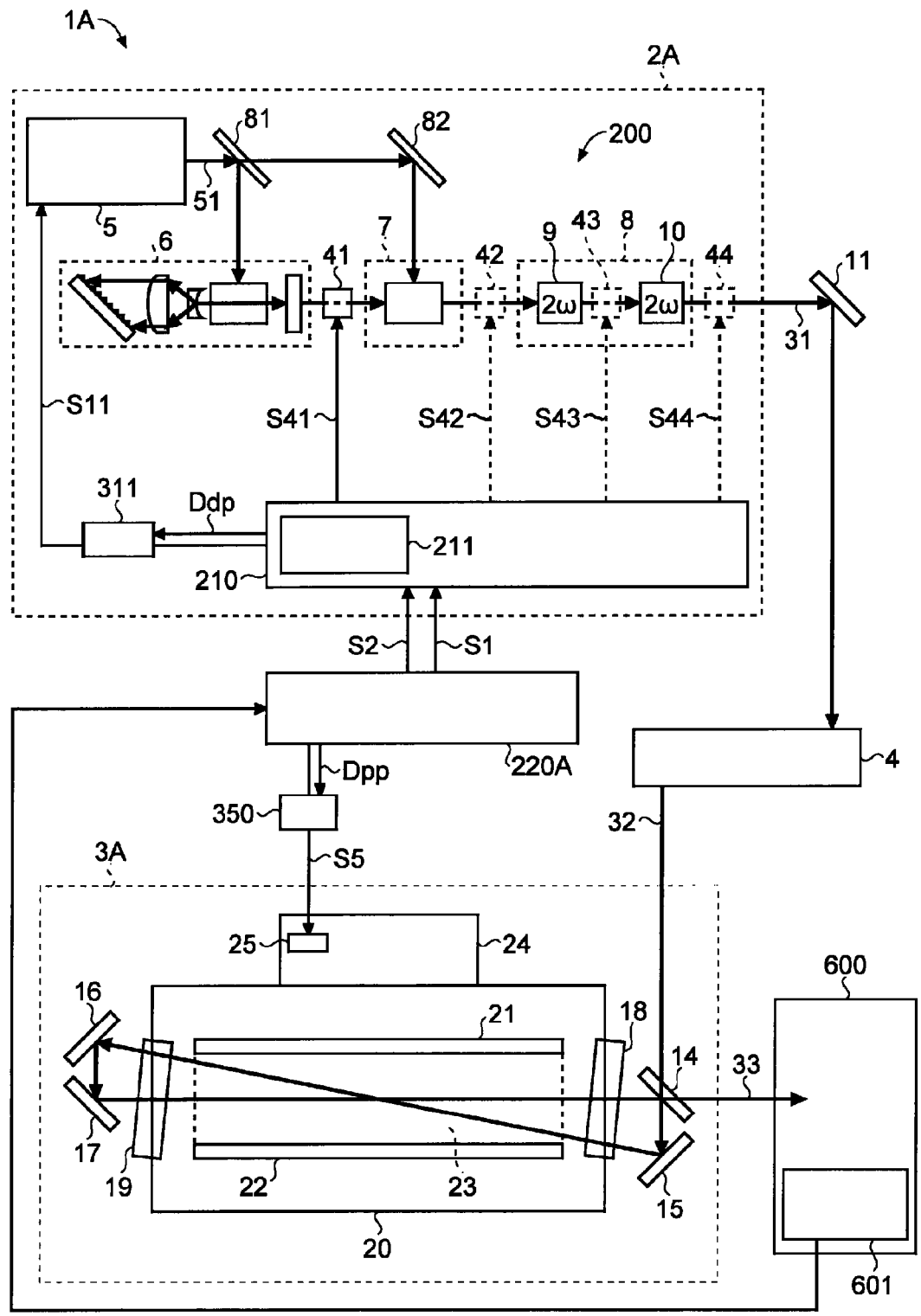
FIG. 3 schematically illustrates a laser system according to a second embodiment of this disclosure.

FIG. 3 schematically illustrates a laser system 1A according to the second embodiment. As shown in FIG. 3, the laser system 1A may include a master oscillator 2A, the high-reflection mirror 11, the low-coherence optical system 4, an amplification device 3A, and a laser controller 220A. The laser controller 220A may control the overall operations of the laser system 1A.

In addition to the same constituent elements as the amplification device 3 shown in FIG. 1, the amplification device 3A may include a laser power source 24 and a switch delay circuit 350. The laser power source 24 may be electrically connected to the anode 21 and the cathode 22 in the chamber 20. The delay circuit 350 may delay a switch signal S5 outputted from the laser controller 220A to a switch 25 in the laser power source 24 by a predetermined delay time (a switch delay time Dpp).

4.1.1 Master Oscillator Including Optical Shutter

Figure 4:
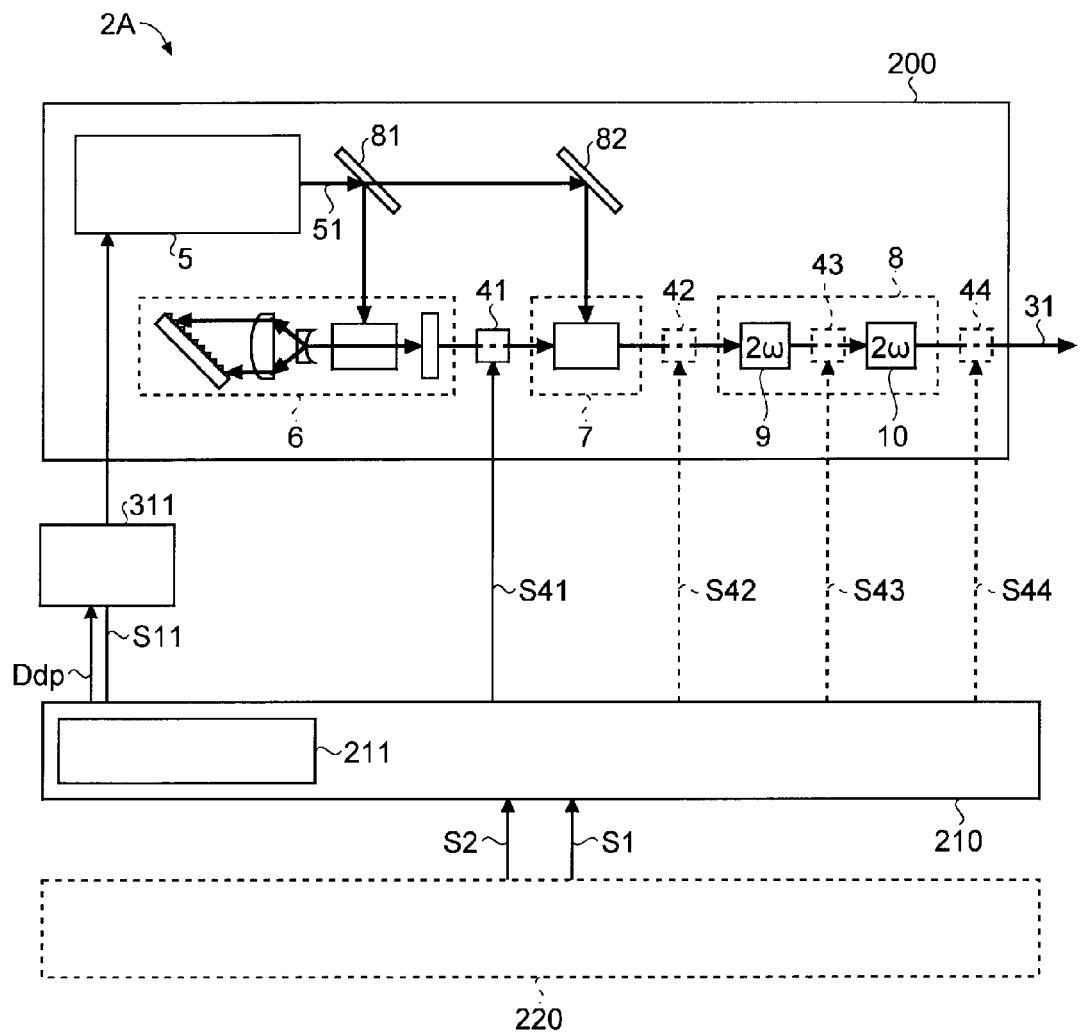
FIG. 4 schematically illustrates a master oscillator illustrated in FIG. 3.

Here, FIG. 4 schematically illustrates the master oscillator 2A according to the second embodiment. As shown in FIG. 4, the master oscillator 2A may include a solid-state laser device 200 and a controller 210. The master oscillator 2A may also include one or more delay circuits that delay various types of signals inputted from the controller 210 to the solid-state laser device 200 in order to carry out timing adjustments.

The solid-state laser device 200 may include, as described above, the pumping laser 5, the Ti: sapphire laser 6 (a seed laser), the amplifier 7, a wavelength conversion unit 8 that includes the LBO crystal 9 and the KBBF crystal 10, the beam splitter 81, and the high-reflection mirror 82. The solid-state laser device 200 may further include at least one optical shutter from among optical shutters 41 through 44. An optical shutter 41 may be disposed in the optical path between the Ti: sapphire laser 6 and the amplifier 7. An optical shutter 42 may be disposed in the optical path between the amplifier 7 and the wavelength conversion unit 8. An optical shutter 43 may be disposed in the optical path between the LBO crystal 9 and the KBBF crystal 10. An optical shutter 44 may be disposed at the output end of the master oscillator 2A. The optical shutters 41 through 44 may have identical configurations and may operate in identical ways. Alternatively, the configurations and operations of the optical shutters 41 through 44 may be different from one another.

The controller 210 may include an internal trigger oscillator 211. The internal trigger oscillator 211 may, for example, oscillate an internal trigger at a predetermined repetition rate. In addition, a trigger signal S1 may be inputted into the controller 210 at an approximately predetermined repetition rate from an external device 220 that serves as a higher-level controller, such as the laser controller 220A or the like. The controller 210 may input an internal trigger oscillated by the internal trigger oscillator 211, or the trigger signal S1 inputted from the external device 220, to the pumping laser 5 as a pumping laser oscillation signal S11. Through this, the pumping laser 5 can continuously output the pumping light 51 at the approximately predetermined repetition rate. Note that the repetition rate of the internal trigger may be approximately the same as the repetition rate of the trigger signal S1, or may be different. It is preferable for the repetition rate of the internal trigger to be a repetition rate at which large thermal fluctuations do not arise in the pumping laser 5, the Ti: sapphire laser 6, the amplifier 7, and so on; for example, approximately the same repetition rate as the trigger signal S1.

The delay circuit may include an oscillation delay circuit 311. The oscillation delay circuit 311 may delay the pumping laser oscillation signal S11 by a predetermined delay time (an oscillation delay time Ddp). It is preferable for the oscillation delay time Ddp to be able to be set in the oscillation delay circuit 311 from an external device.

In addition, a burst request signal S2 may be inputted to the controller 210 from the external device 220. The period in which the burst request signal S2 is being inputted into the controller 210 may be taken as the burst output period TB. The controller 210 may, based on the burst request signal S2, generate optical shutter operation signals S41 through S44 that cause the respective optical shutters 41 through 44 to open/close.

4.1.2 Optical Shutter (Combination of Pockels Cell and Polarizer)

Figure 5:
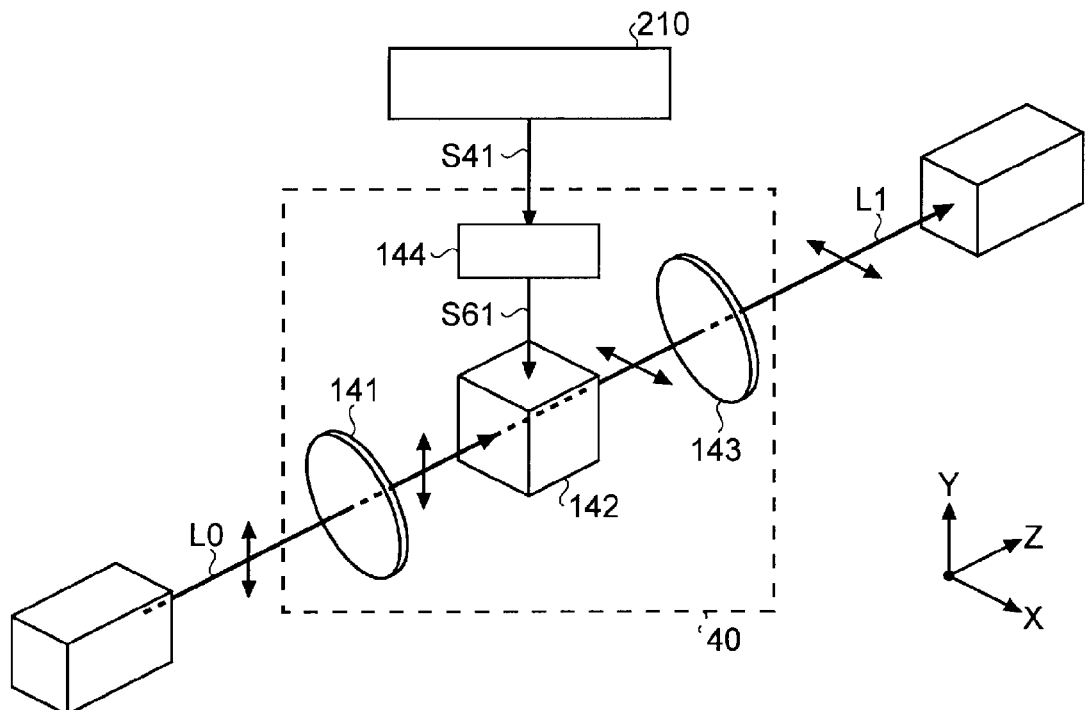
FIG. 5 illustrates an example of an optical shutter illustrated in FIG. 4.

Here, FIG. 5 illustrates an example of an optical shutter according to the second embodiment. Note that an optical shutter 40 illustrated in FIG. 5 may be applied as any of the optical shutters 41 through 44.

As shown in FIG. 5, the optical shutter 40 may include, for example, two polarizers 141 and 143, a Pockels cell 142, and a high-voltage power source 144. The polarizer 141 may transmit, for example, a Y-direction polarized component of the incident light and block an X-direction polarized component of the light. On the other hand, the polarizer 143 may transmit, for example, an X-direction polarized component of the incident light and block a Y-direction polarized component of the light. In this manner, the polarizer 141 and the polarizer 143 may allow different polarized components of the light to pass therethrough. For example, the polarization direction of the light allowed to pass through may differ by approximately 90° between the polarizer 141 and the polarizer 143, as in this example.

An optical shutter operation signal S41 may be inputted into the high-voltage power source 144 of the optical shutter 40. When the high-voltage power source 144 is inputted with the optical shutter operation signal S41, the high-voltage power source 144 may apply a voltage S61 to the Pockels cell 142. The voltage S61 may have a pulse width (time length) that is substantially the same as the pulse width of the optical shutter operation signal S41. The Pockels cell 142 can, for example, change the polarization direction of inputted light while the voltage S61 is being applied. In this example, the voltage S61 having a voltage value that changes the polarization direction of the inputted light by approximately 90° may be applied to the Pockels cell 142 by the high-voltage power source 144.

Pulsed laser light L0 that has entered the optical shutter 40 may first be incident on the polarizer 141. The polarizer 141 may transmit the Y-direct ion linearly-polarized component of the inputted pulsed laser light L0 (called "Y linearly-polarized pulsed laser light" hereinafter). The Y linearly-polarized pulsed laser light that has passed through the polarizer 141 enters the Pockels cell 142.

When the voltage S61 is not applied to the Pockels cell 142, the Y linearly-polarized pulsed laser light that has entered the Pockels cell 142 is outputted from the Pockels cell 142 as Y-direction linearly-polarized light without having its polarization direction being changed, and is incident on the polarizer 143. Accordingly, the Y linearly-polarized pulsed laser light that has passed through the Pockels cell 142 is reflected and absorbed by the polarizer 143. As a result, the pulsed laser light L0 is blocked by the optical shutter 40.

On the other hand, when the voltage S61 is being applied to the Pockels cell 142, the polarization direction of the Y linearly-polarized pulsed laser light that has entered the Pockels cell 142 can be changed by approximately 90°. As a result, X-direction linearly-polarized pulsed laser light (called "X linearly-polarized pulsed laser light" hereinafter) can be outputted from the Pockels cell 142. This X linearly-polarized pulsed laser light passes through the polarizer 143. As a result, pulsed laser light L1 is outputted from the optical shutter 40.

Figure 6:
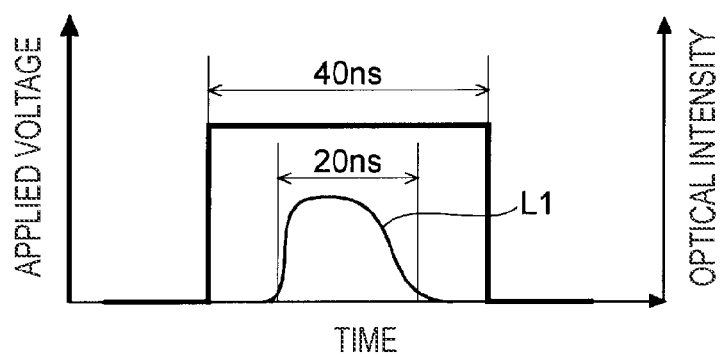
FIG. 6 illustrates a relationship between a single instance of pulsed laser light and operations performed by an optical shutter according to the second embodiment.

On the other hand, as shown in FIG. 6, assuming that the time length (pulse duration) of the pulsed laser light L0 is, for example, 20 ns, it is preferable to apply the voltage S61 having a duration capable of absorbing a small amount of time jitter in the pulsed laser light L0 (for example, 40 ns) to the Pockels cell 142 of the optical shutter 40. However, if the duration of the voltage S61 is too long, there is a chance that returning light cannot be blocked. For this reason, it is preferable for the duration of the voltage S61 to be set appropriately. Note that a typical Pockels cell has a responsiveness of several nanoseconds, and thus is thought to be suitable in optical shutters for laser systems in which high-speed switching is demanded.

Note that the present example is a configuration in which the polarization directions of the pulsed laser light L0 that has passed through the polarizer 141 and the pulsed laser light L1 that has passed through the polarizer 143 have been changed by approximately 90°. For this reason, the optical shutter 40 may be in an open state while the voltage S61 is applied to the Pockels cell 142. However, the scope of this disclosure is not limited to this example. For example, the pulsed laser light L0 that has passed through the polarizer 141 and the pulsed laser light L1 that has passed through the polarizer 143 may be polarized in the same direction. In this case, the optical shutter 40 may be in an open state while the voltage S61 is not applied to the Pockels cell 142. Note that an optical shutter being in an "open state" refers to putting the optical shutter in a state in which pulsed laser light can pass therethrough, whereas an optical shutter being in a "closed state" refers to putting the optical shutter in a state in which pulsed laser light is blocked.

4.2 Operations

Next, operations performed by the laser system 1A according to the second embodiment will be described in detail with reference to the drawings.

4.2.1 Master Oscillator Timing Chart

Figure 7:
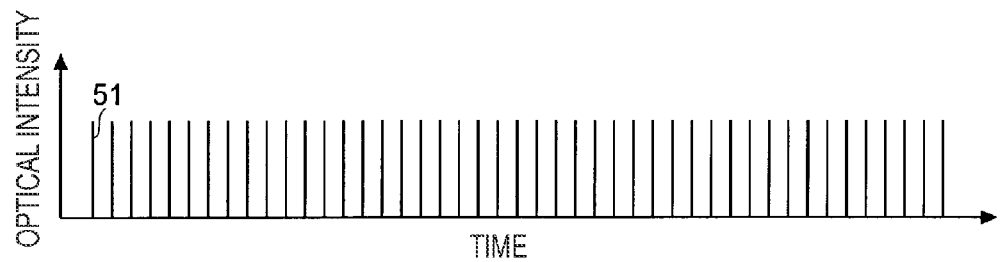
FIG. 7 illustrates pumping light outputted from a pumping laser according to the second embodiment.
Figure 8:
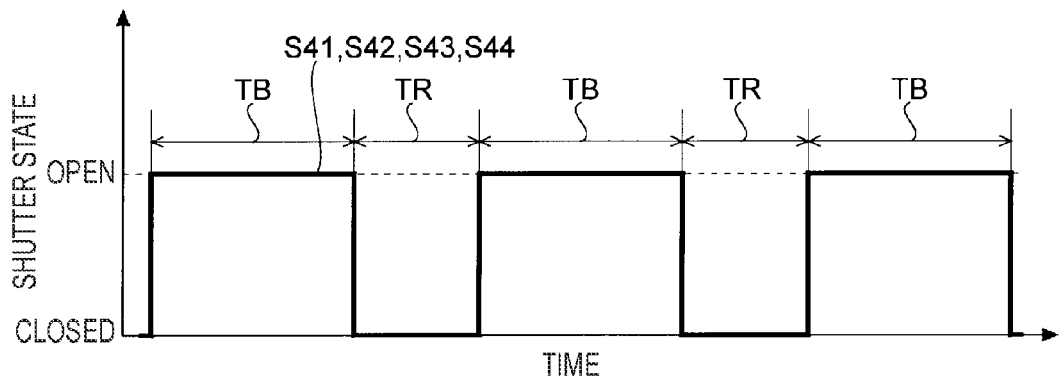
FIG. 8 illustrates opening/closing operations performed by an optical shutter according to the second embodiment.
Figure 9:
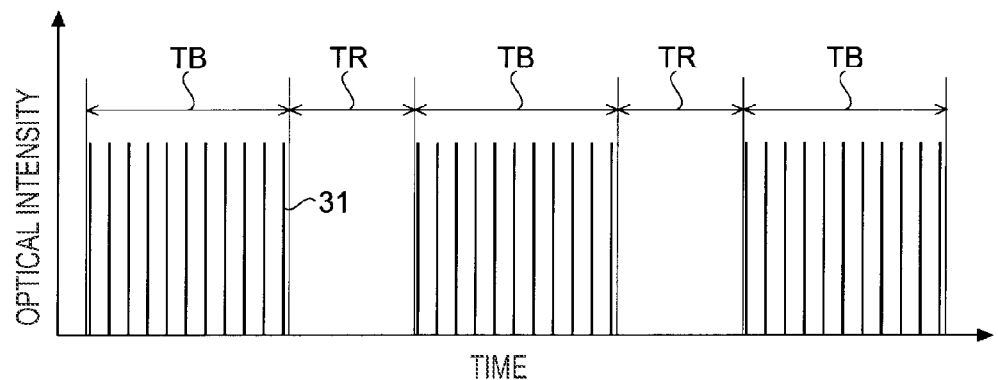
FIG. 9 illustrates pulsed laser light outputted from a master oscillator according to the second embodiment.

FIGS. 7 through 9 are examples of timing charts illustrating the general operations performed by the master oscillator 2A according to the second embodiment. FIG. 7 illustrates the pumping light 51 outputted from the pumping laser 5. FIG. 8 illustrates opening/closing operations of the optical shutters 41 through 44. FIG. 9 illustrates the pulsed laser light 31 outputted from the master oscillator 2A.

The controller 210 may input the pumping laser oscillation signal S11 internal trigger to the pumping laser 5 at a predetermined repetition rate. Then, as shown in FIG. 7, the pumping light 51 may be continuously outputted from the pumping laser 5 at an approximately predetermined repetition rate. Through this, the pulsed laser light L0 may be outputted continuously from the Ti: sapphire laser 6 at an approximately predetermined repetition rate, in the same manner as the pumping light 51 shown in FIG. 7.

On the other hand, as shown in FIG. 8, the controller 210 may input the optical shutter operation signals S41 through S44 for putting the respective optical shutters 41 through 44 into the open state into the optical shutters 41 through 44 during the burst output period TB, or in other words, during the period after the rise of the burst request signal S2 until the fall of the burst request signal S2. Through this, the optical shutters 41 through 44 may enter the open state. On the other hand, the controller 210 may input the optical shutter operation signals S41 through S44 for putting the optical shutters 41 through 44 into the closed state into the optical shutters 41 through 44 during the burst rest period TR (i.e. after the fall of the burst request signal S2 until the rise of a subsequent burst request signal S2). Through this, the optical shutters 41 through 44 may enter the closed state.

Through such opening/closing operations of the optical shutters 41 through 44, as shown in FIG. 9, the pulsed laser light 31 of a predetermined repetition rate may be outputted from the master oscillator 2A during the burst output period TB. On the other hand, the pulsed laser light 31 may not be outputted from the master oscillator 2A during the burst rest period TR.

4.2.2 Laser System Flowchart

Figure 10:
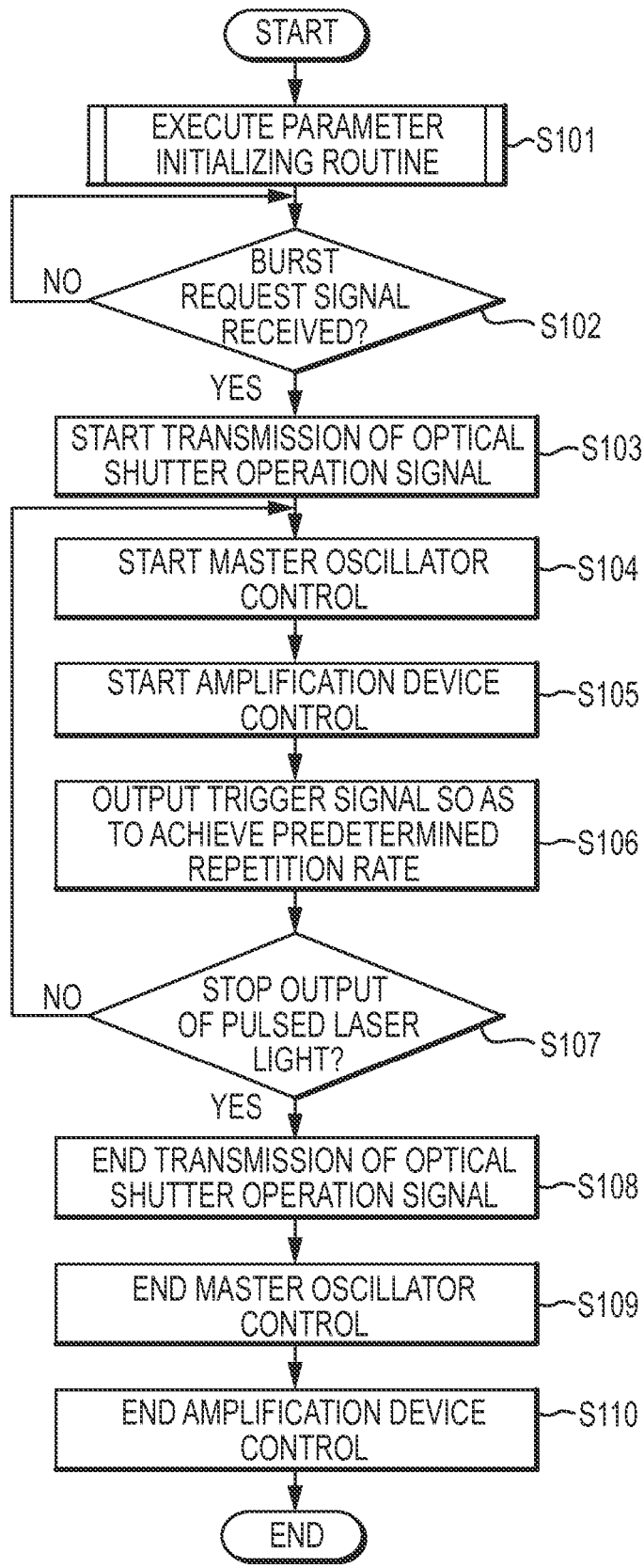
FIG. 10 is a flowchart illustrating the general operations performed by the laser system according to the second embodiment.
Figure 11:
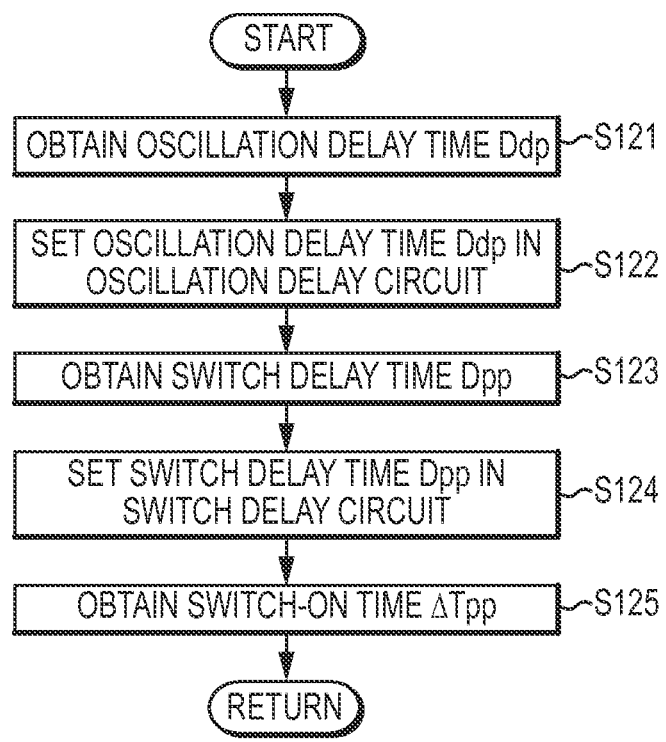
FIG. 11 is a flowchart illustrating the general operations in a parameter initializing routine, indicated in step S101 of FIG. 10, according to the second embodiment.
Figure 12:
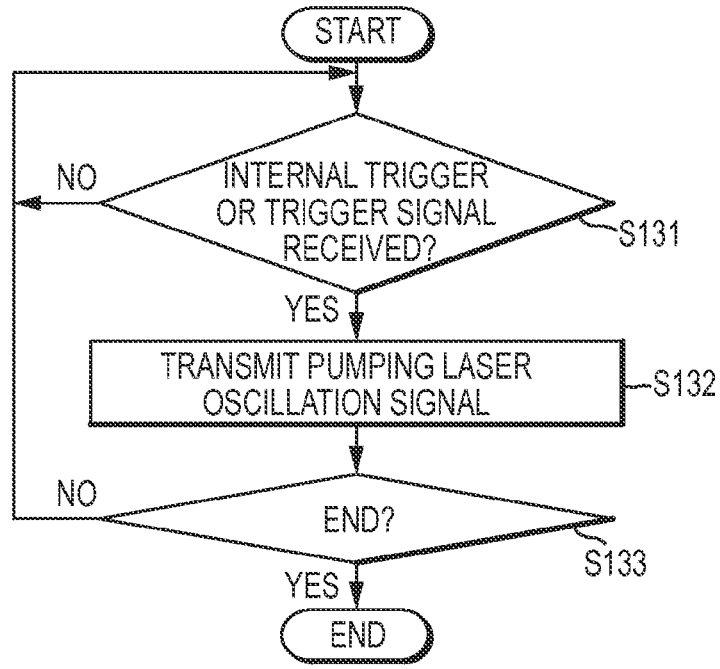
FIG. 12 is a flowchart illustrating operations started by a controller in step S103 indicated in FIG. 10, according to the second embodiment.
Figure 13:
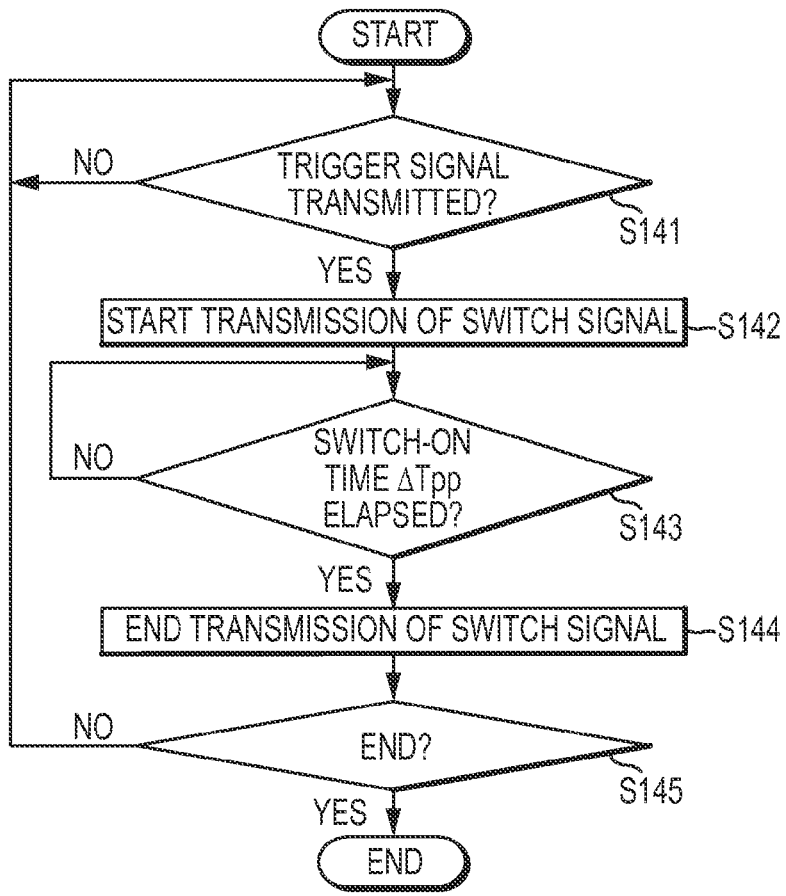
FIG. 13 is a flowchart illustrating operations started by a laser controller in step S104 indicated in FIG. 10, according to the second embodiment.

Next, operations performed by the laser system 1A illustrated in FIG. 3 will be described in detail with reference to the drawings. FIG. 10 is a flowchart illustrating an overview of operations of the laser system 1A. FIG. 11, meanwhile, is a flowchart illustrating an overview of operations performed in a parameter initializing routine, indicated in step S101 of FIG. 10. FIG. 12 is a flowchart illustrating operations started by the controller 210 in step S104 of FIG. 10. FIG. 13 is a flowchart illustrating operations started by the laser controller 220A in step S105 of FIG. 10. Note that FIG. 10, FIG. 11, and FIG. 13 indicate operations performed by the laser controller 220A. FIG. 12, meanwhile, indicates operations performed by the controller 210.

As shown in FIG. 10, after starting up, the laser controller 220A may execute a parameter initializing routine that initializes various parameters (step S101). Note that the initial parameters to be set may be recorded in advance, or may be inputted or requested from an external device, such as from an exposure controller 601.

Next, the laser controller 220A may stand by until the burst request signal S2, requesting a burst of the pulsed laser light 33, is received from the exposure controller 601 or the like (step S102; NO). When the burst request signal S2 is received (step S102; YES), the laser controller 220A may begin sending the optical shutter operation signals S41 through S44 for putting the respective optical shutters 41 through 44 into the open state to the optical shutters 41 through 44 (step S103). Through this, the optical shutters 41 through 44 may enter the open state.

Next, the laser controller 220A may execute control causing the master oscillator 2A to output a burst of the pulsed laser light 31 (step S104). Along with this, the laser controller 220A may execute control causing the amplification device 3A to perform a discharge (step S105). Next, the laser controller 220A may output the trigger signal S1 to the controller 210 so as to achieve a predetermined repetition rate for the trigger signal S1 (step S106).

Thereafter, the laser controller 220A may determine whether or not to stop the output of the pulsed laser light 33 (step S107). When the output is to be stopped (step S107; YES), the laser controller 220A may end the output of the optical shutter operation signals S41 through S44 started in step S103 (step S108). Next, the laser controller 220A may end the control of the master oscillator 2A started in step S104 (step S109). In addition, the laser controller 220A may end the control of the amplification device 3A started in step S105 (step S110), and thereafter, may end the present operations. On the other hand, when the output is not to be stopped (step S107; NO), the laser controller 220A may return to step S104 and execute the subsequent operations.

Next, an overview of the operations in the parameter initializing routine indicated in step S101 of FIG. 10 will be described. As shown in FIG. 11, in the parameter initializing routine, the laser controller 220A may obtain the oscillation delay time Ddp set in the oscillation delay circuit 311 (step S121). The obtained oscillation delay time Ddp may be a default value stored in advance in a memory or the like (not shown), or may be a value newly calculated by the laser controller 220A. Subsequently, the laser controller 220A may set the obtained oscillation delay time Ddp in the oscillation delay circuit 311 via the controller 210 (step S122). Through this, the timing of the pumping laser oscillation signal S11 that passes through the oscillation delay circuit 311 may be delayed by an amount equivalent to the oscillation delay time Ddp.

Next, the laser controller 220A may obtain the switch delay time Dpp set in the switch delay circuit 350 (step S123). The obtained switch delay time Dpp may be a default value stored in advance in a memory or the like (not shown), or may be a value newly calculated by the laser controller 220A. Then, the laser controller 220A may set the obtained switch delay time Dpp in the switch delay circuit 350 (step S124). Through this, the timing of the switch signal S5 that passes through the switch delay circuit 350 may be delayed by an amount equivalent to the switch delay time Dpp.

Next, the laser controller 220A may obtain a time to turn a switch 25 on, or in other words, a time for which to apply a discharge voltage between the anode 21 and the cathode 22 (that is, a switch-on time ΔTpp) (step S125). The obtained switch-on time ΔTpp may be a default value stored in advance in a memory or the like (not shown), or may be a value newly calculated by the laser controller 220A. Thereafter, the process commanded by the laser controller 220A may return to the operations indicated in FIG. 10.

Operations started by the laser controller 210 in step S104 in FIG. 10 will now be described. As shown in FIG. 12, under the control of the laser controller 220A, the controller 210 may stand by until, for example, the trigger signal S1 is received from the laser controller 220A (step S131; NO). Note that the controller 210 may transmit the internal trigger oscillated by the internal trigger oscillator 211 at a predetermined repetition rate to the pumping laser 5 as the pumping laser oscillation signal S11 while the trigger signal S1 is not inputted from the laser controller 220A at an approximately predetermined repetition rate.

When the trigger signal S1 is received (step S131; YES), the controller 210 may transmit the trigger signal S1 to the pumping laser 5 as the pumping laser oscillation signal S11 (step S132). The pumping laser oscillation signal S11 may be inputted to the pumping laser 5 through the oscillation delay circuit 311.

After this, the controller 210 may determine whether or not an end to the operations has been specified by the laser controller 220A or the like (step S133). In the case where the end has been specified (step S133; YES), the controller 210 may end the present operations. On the other hand, when the end has not been specified (step S133; NO), the process commanded by the controller 210 may return to step S131.

Next, operations started by the laser controller 220A in step S105 of FIG. 10 will now be described. As shown in FIG. 13, the laser controller 220A may stand by until the trigger signal S1 is outputted to the controller 210 at an approximately predetermined repetition rate (step S141; NO). When the trigger signal S1 is outputted (step S141; YES), the laser controller 220A may start the transmission of the switch signal S5 to the switch 25 (step S142). The switch signal S5 may be inputted to the switch 25 through the switch delay circuit 350. The switch delay time Dpp may be set in the switch delay circuit 350 so that a discharge occurs in the discharge space 23 in correspondence with the timing at which the pulsed laser light 32 that has traveled through the low-coherence optical system 4 passes through the discharge space 23.

Thereafter, the laser controller 220A may measure the time that has elapsed after the start of the transmission of the switch signal S5 using, for example, a timer or the like (not shown). The laser controller 220A may then stand by until the measured time exceeds or reaches the pre-set switch-on time ΔTpp (step S143; NO).

When the switch-on time ΔTpp has elapsed (step S143; YES), the laser controller 220A may end the transmission of the switch signal S5 (step S144). Through this, the period in which a discharge occurs in the discharge space 23 may be adjusted. Thereafter, the laser controller 220A may determine whether or not to end the operations (step S145). When the operations are to be ended (step S145; YES), the laser controller 220A may end the present operations. However, when the operations are not to be ended (step S145; NO), the process commanded by the laser controller 220A may return to step S141.

4.3 Effects

By operating in the above manner, the pumping laser 5 can be continuously oscillated at a predetermined repetition rate when repeatingly operating the master oscillator 2A between the burst output period TB and the burst rest period TR in an alternating manner. Through this, the pumping laser 5 can be made thermally stable. In addition, the pumping light 51 from the pumping laser 5 can be continuously inputted into the Ti: sapphire laser 6. Through this, the Ti: sapphire laser 6 can be made thermally stable. Furthermore, the pumping light 51 can be continuously inputted into the amplifier 7. Through this, the amplifier 7 can be made thermally stable. As a result, the pulsed laser light 31 outputted from the master oscillator 2A can be stabilized. In other words, burst oscillation provided by the stable pulsed laser light 31 can be repeated. In addition, a discharge can be caused to occur in the discharge space 23 in correspondence with the timing at which the pulsed laser light outputted from the master oscillator 2A passes through the discharge space 23 within the amplification device 3A.

5. Laser System Combining Master Oscillator Having Optical Shutter and Amplification Device (Third Embodiment)

Next, another embodiment of the laser system will be described in detail, with reference to the drawings, as a third embodiment of this disclosure.

5.1 Configuration

Figure 14:
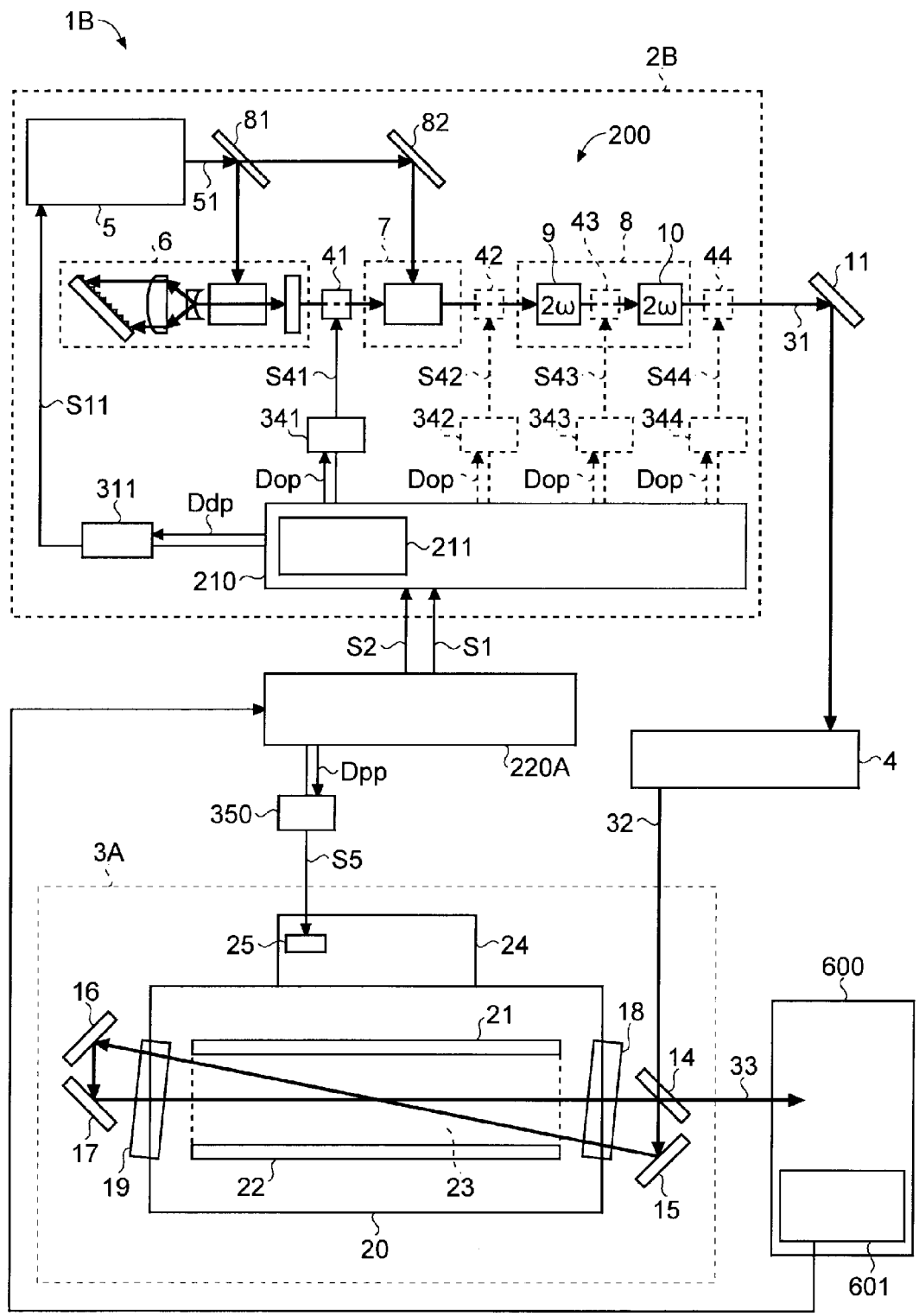
FIG. 14 schematically illustrates a laser system according to a third embodiment of this disclosure.

FIG. 14 schematically illustrates a laser system 1B according to the third embodiment. As shown in FIG. 14, the laser system 1B may have a similar configuration as the laser system 1A shown in FIG. 3. However, in the laser system 1B, the master oscillator 2A provided in the laser system 1A is replaced with a master oscillator 2B.

The master oscillator 2B may have first through fourth shutter delay circuits 341 through 344, in addition to the same components as those in the master oscillator 2A. The first through fourth shutter delay circuits 341 through 344 may be provided for the respective optical shutters 41 through 44. The first through fourth shutter delay circuits 341 through 344 may delay the optical shutter operation signals S41 through S44 outputted to the optical shutters 41 through 44 from the controller 210 by a predetermined delay time in accordance with each of the optical shutters 41 through 44 (that is, a shutter delay time Dpp). The first through fourth shutter delay circuits 341 through 344 may delay the optical shutter operation signals S41 through S44 so that the optical shutters 41 through 44 enter the open state in accordance with the timings at which the pulsed laser light L1 passes through the corresponding optical shutters 41 through 44.

5.2 Operations

Next, operations performed by the laser system 1B according to the third embodiment will be described in detail with reference to the drawings.

5.2.1 Master Oscillator Timing Chart

Figure 15:
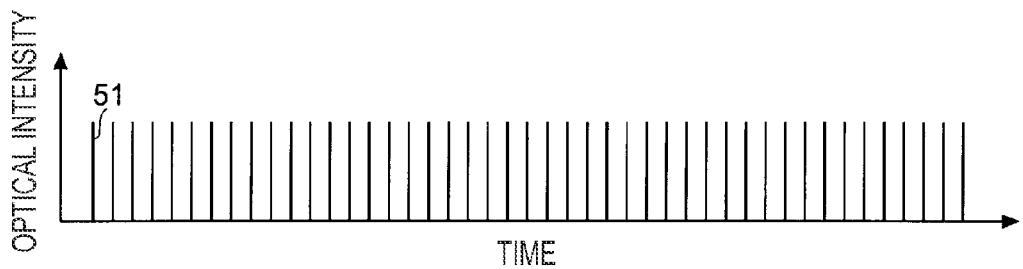
FIG. 15 illustrates pumping light outputted from a pumping laser according to the third embodiment.
Figure 16:
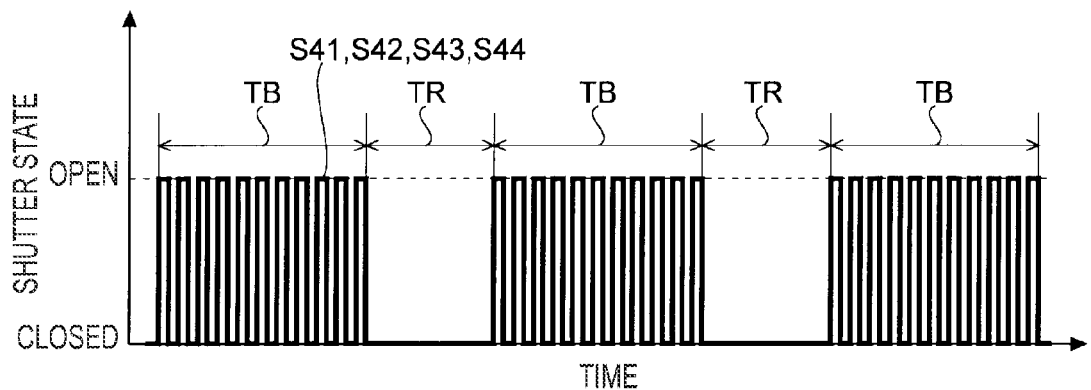
FIG. 16 illustrates opening/closing operations performed by an optical shutter according to the third embodiment.
Figure 17:
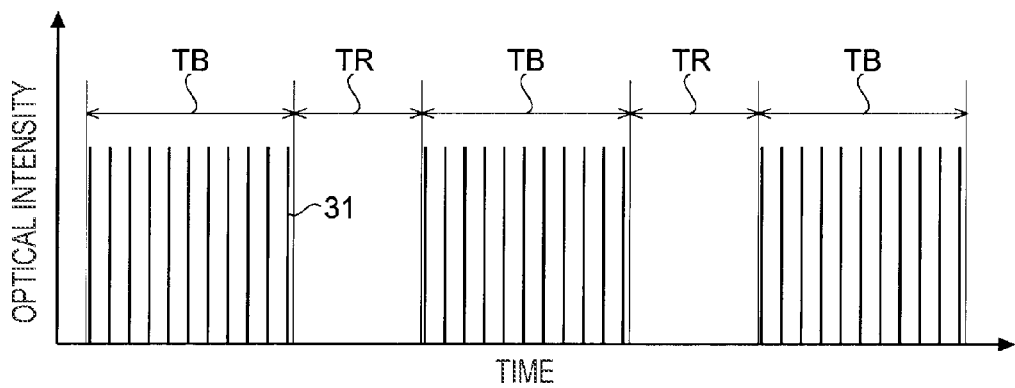
FIG. 17 illustrates pulsed laser light outputted from a master oscillator according to the third embodiment.

FIGS. 15 through 17 are examples of timing charts illustrating the general operations performed by the master oscillator 2B according to the third embodiment. FIG. 15 illustrates the pumping light 51 outputted from the pumping laser 5. FIG. 16 illustrates opening/closing operations of the optical shutters 41 through 44. FIG. 17 illustrates the pulsed laser light 31 outputted from the master oscillator 2B.

As can be seen by comparing FIGS. 8 and 16, in the present operational example, the optical shutters 41 through 44 carry out opening/closing operations for each instance of pulsed laser light during the burst output period TB. According to such operations as well, burst output of the pulsed laser light 31 can be generated as illustrated in FIG. 17 based on the pumping light 51 having a continuous predetermined repetition rate as illustrated in FIG. 15.

5.2.2 Laser System Flowchart

Figure 18:
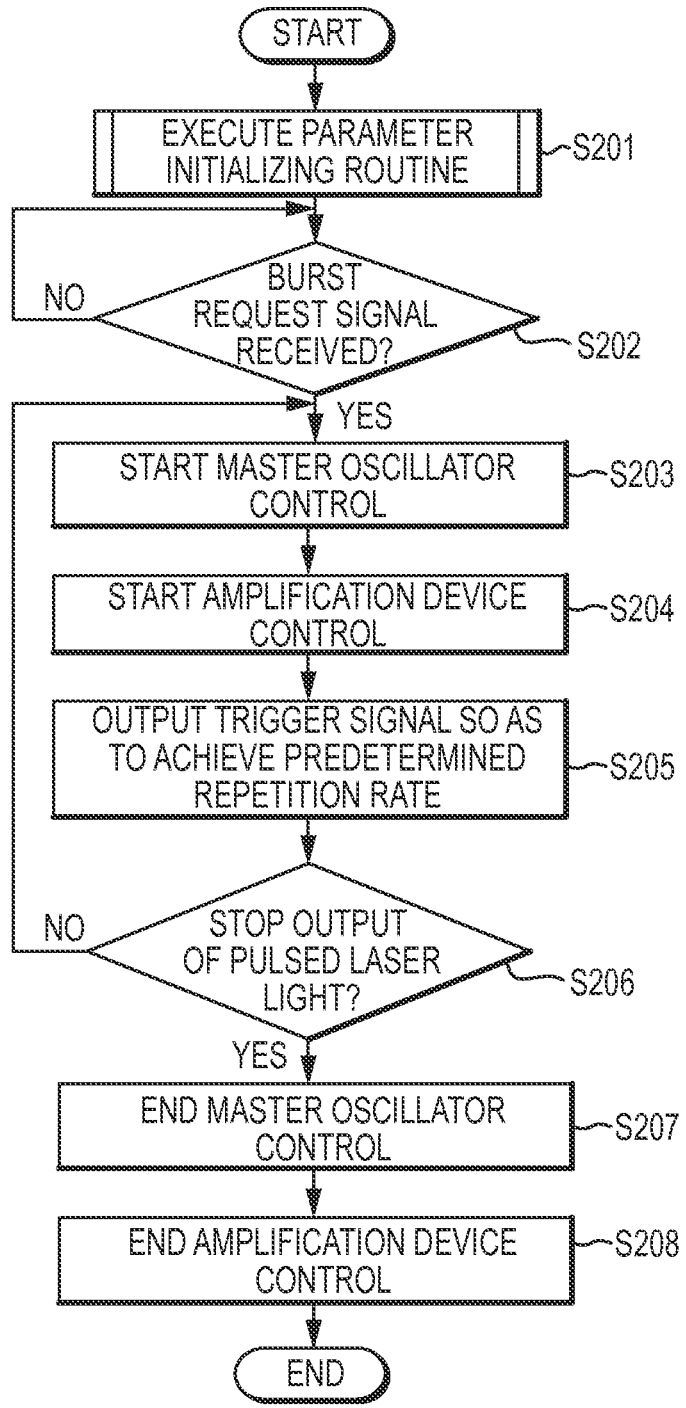
FIG. 18 is a flowchart illustrating the general operations performed by the laser system according to the third embodiment.
Figure 19:
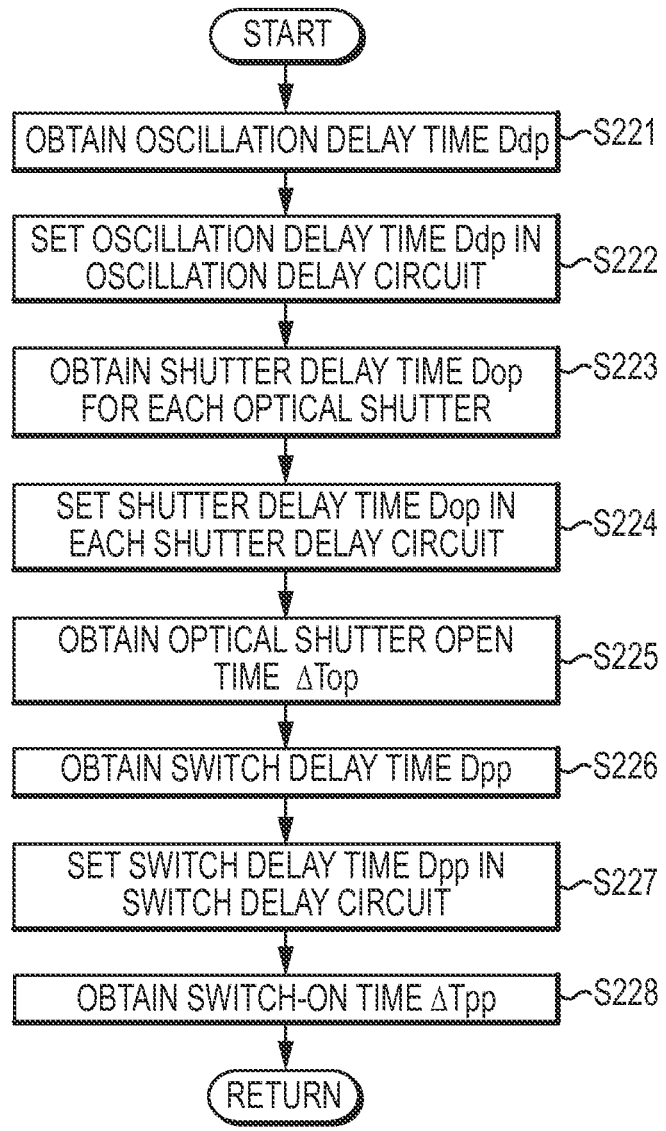
FIG. 19 is a flowchart illustrating the general operations in a parameter initializing routine, indicated in step S201 of FIG. 18, according to the third embodiment.
Figure 20:
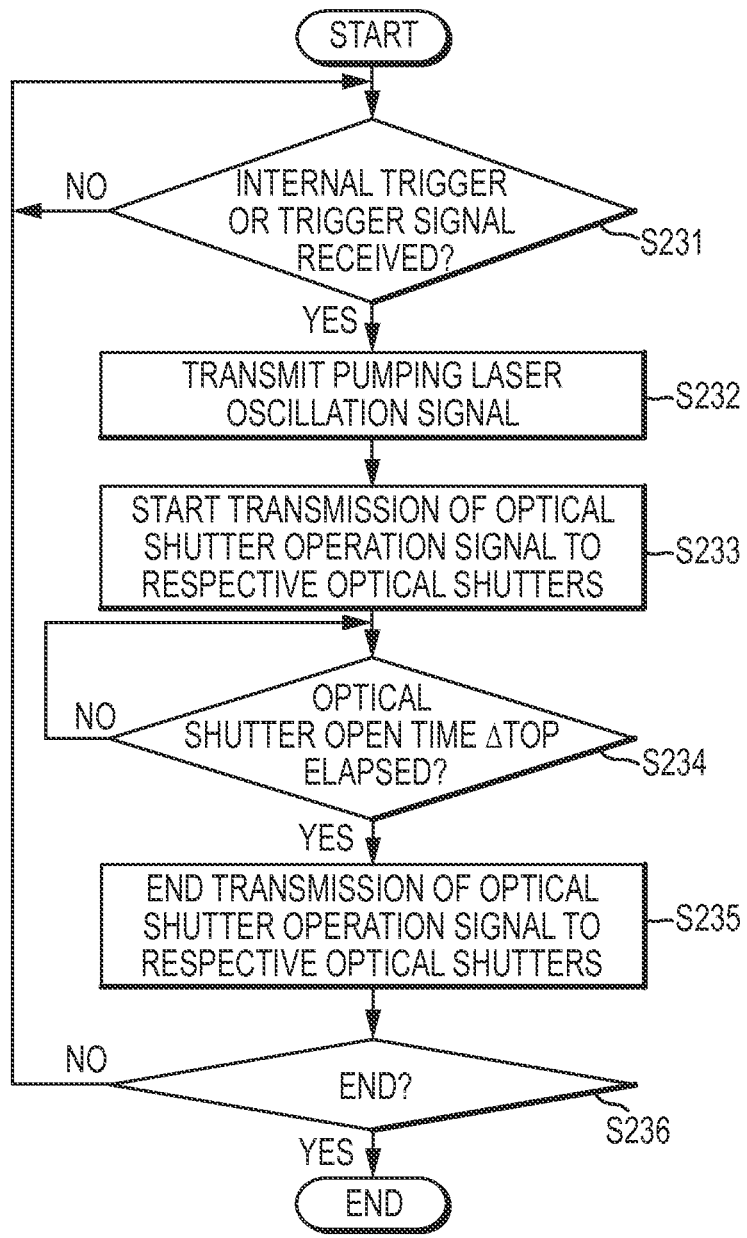
FIG. 20 is a flowchart illustrating operations started by a controller in step S203 indicated in FIG. 18, according to the third embodiment.
Figure 21:
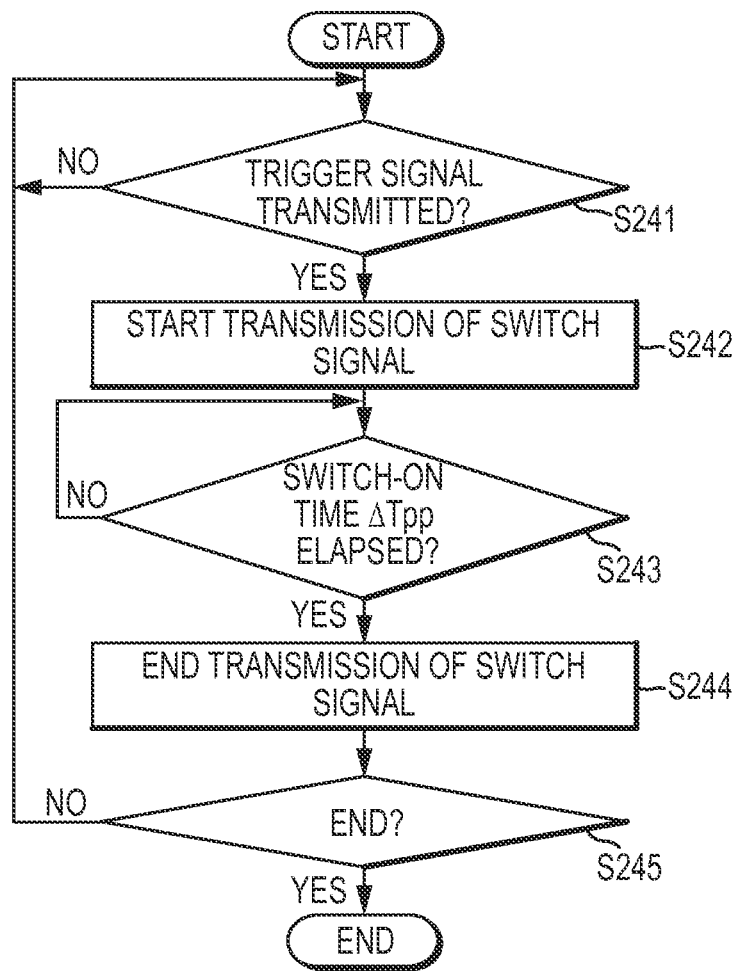
FIG. 21 is a flowchart illustrating operations started by a laser controller in step S204 indicated in FIG. 18, according to the third embodiment.

Next, operations performed by the laser system 1B illustrated in FIG. 14 will be described in detail with reference to the drawings. FIG. 18 is a flowchart illustrating an overview of operations of the laser system 1B. FIG. 19 is a flowchart illustrating an overview of operations performed in a parameter initializing routine, indicated in step S201 of FIG. 18. FIG. 20 is a flowchart illustrating operations started by the controller 210 in step S203 of FIG. 18. FIG. 21 is a flowchart illustrating operations started by the laser controller 220A in step S204 of FIG. 18. Note that FIG. 18, FIG. 19, and FIG. 21 indicate operations performed by the laser controller 220A. FIG. 20, meanwhile, indicates operations performed by the controller 210.

As shown in FIG. 18, after starting up, the laser controller 220A may execute a parameter initializing routine that initializes various parameters (step S201). Note that the initial parameters to be set may be recorded in advance, or may be inputted or requested from an external device, such as from the exposure controller 601.

Next, the laser controller 220A may stand by until the burst request signal S2, requesting a burst of the pulsed laser light 33, is received from the exposure controller 601 or the like (step S202; NO). When the burst request signal S2 is received (step S202; YES), the laser controller 220A may execute control causing the master oscillator 2B to output a burst of the pulsed laser light 31 (step S203). Along with this, the laser controller 220A may execute control causing the amplification device 3A to perform a discharge (step S204). Next, the laser controller 220A may output the trigger signal 51 to the controller 210 so as to achieve a predetermined repetition rate for the trigger signal 51 (step S205).

Thereafter, the laser controller 220A may determine whether or not to stop the output of the pulsed laser light 33 (step S206). When the output is to be stopped (step S206; YES), the laser controller 220A may end the control of the master oscillator 2B started in step S203 (step S207). In addition, the laser controller 220A may end the control of the amplification device 3A started in step S204 (step S208), and thereafter, may end the present operations. On the other hand, when the output is not to be stopped (step S206; NO), the laser controller 220A may return to step S203 and execute the subsequent operations.

Next, an overview of the operations in the parameter initializing routine indicated in step S201 of FIG. 18 will be described. As shown in FIG. 19, in the parameter initializing routine, the laser controller 220A may obtain the oscillation delay time Ddp set in the oscillation delay circuit 311 (step S221). The obtained oscillation delay time Ddp may be a default value stored in advance in a memory or the like (not shown), or may be a value newly calculated by the laser controller 220A. Subsequently, the laser controller 220A may set the obtained oscillation delay time Ddp in the oscillation delay circuit 311 via the controller 210 (step S222). Through this, the timing of the pumping laser oscillation signal S11 that passes through the oscillation delay circuit 311 may be delayed by an amount equivalent to the oscillation delay time Ddp.

Next, the laser controller 220A may obtain a shutter delay time Dop to set in the first through fourth shutter delay circuits 341 through 344 (step S223). The obtained shutter delay time Dop for the first through fourth shutter delay circuits 341 through 344 may be a default value stored in advance in a memory or the like (not shown), or may be a value newly calculated by the laser controller 220A. Next, the laser controller 220A may set the obtained shutter delay time Dop in the first through fourth shutter delay circuits 341 through 344 via the controller 210 (step S224). Through this, the timings of the optical shutter operation signals S41 through S44 that pass through the respective first through fourth shutter delay circuits 341 through 344 may be delayed by an amount equivalent to the shutter delay time Dop.

Next, the laser controller 220A may obtain a time for which to put the optical shutters 41 through 44 into the open state, or in other words, an emission time of the pulsed laser light L1 (an optical shutter open time ΔTop) (step S225). The obtained optical shutter open time ΔTop may be a default value stored in advance in a memory or the like (not shown), or may be a value newly calculated by the laser controller 220A.

Next, the laser controller 220A may obtain the switch delay time Dpp set in the switch delay circuit 350 (step S226). The obtained switch delay time Dpp may be a default value stored in advance in a memory or the like (not shown), or may be a value newly calculated by the laser controller 220A. Then, the laser controller 220A may set the obtained switch delay time Dpp in the switch delay circuit 350 (step S227). Through this, the timing of the switch signal S5 that passes through the switch delay circuit 350 may be delayed by an amount equivalent to the switch delay time Dpp.

Next, the laser controller 220A may obtain a time to turn a switch 25 on, or in other words, a time for which a discharge voltage is applied between the anode 21 and the cathode 22 (i.e. a switch-on time ΔTpp) (step S228). The obtained switch-on time ΔTpp may be a default value stored in advance in a memory or the like (not shown), or may be a value newly calculated by the laser controller 220A. Thereafter, the laser controller 220A may return to the operations indicated in FIG. 18.

Operations started by the laser controller 210 in step S203 of FIG. 18 will now be described. As shown in FIG. 20, under the control of the laser controller 220A, the controller 210 may stand by until, for example, the trigger signal S1 is received from the laser controller 220A (step S231; NO). Note that the controller 210 may transmit the internal trigger generated by the internal trigger oscillator 211 at a predetermined repetition rate to the pumping laser 5 as the pumping laser oscillation signal S11 while the trigger signal S1 is not being inputted from the laser controller 220A at an approximately predetermined repetition rate.

When the trigger signal S1 is received (step S231; YES), the controller 210 may transmit the pumping laser oscillation signal S11 to the pumping laser 5 (step S232). Furthermore, the controller 210 may also start transmitting the optical shutter operation signals S41 through S44 to the respective optical shutters 41 through 44 (step S233). The pumping laser oscillation signal S11 may be inputted to the pumping laser 5 through the oscillation delay circuit 311. The optical shutter operation signals S41 through S44 may be inputted to the respective optical shutters 41 through 44 through the respective first through fourth shutter delay circuits 341 through 344. The oscillation delay circuit 311 may be set so as to delay the pumping laser oscillation signal S11 by an amount equivalent to the oscillation delay time Ddp. The first through fourth shutter delay circuits 341 through 344 may be set respectively different shutter delay times Dop so that the optical shutters 41 through 44 carry out opening/closing operations in correspondence with the timings at which the pulsed laser light passes therethrough. Through this, the timing at which the pumping light 51 is outputted from the pumping laser 5 and the timing at which the respective optical shutters 41 through 44 open and close may be adjusted.

Thereafter, the controller 210 may measure the time that has elapsed after the start of the transmission of the respective optical shutter operation signals S41 through S44 using, for example, a timer or the like (not shown). The controller 210 may then stand by until this measured time has become greater than or equal to the pre-set optical shutter open time ΔTop (step S234; NO).

When the optical shutter open time ΔTop has elapsed (step S234; YES), the controller 210 may end the transmission of the optical shutter operation signals S41 through S44 (step S235). Through this, the optical shutters 41 through 44 may enter the closed state. Note that as described above, the waveform of the pulsed laser light L1 may be made adjustable by using the opening/closing operations of the optical shutters 41 through 44.

After this, the controller 210 may determine whether or not an end to the operations has been specified by the laser controller 220A or the like (step S236). When the end has been specified (step S236; YES), the controller 210 may end the present operations. However, when the end has not been specified (step S236; NO), the controller 210 may return to step S231.

Next, operations started by the laser controller 220A in step S204 of FIG. 18 will now be described. As shown in FIG. 21, the laser controller 220A may stand by until the trigger signal S1 is outputted to the controller 210 at an approximately predetermined repetition rate (step S241; NO). When the trigger signal S1 is outputted (step S241; YES), the laser controller 220A may start the transmission of the switch signal S5 to the switch 25 (step S242). The switch signal S5 may be inputted to the switch 25 through the switch delay circuit 350. The switch delay time Dpp may be set in the switch delay circuit 350 so that a discharge occurs in the discharge space 23 in correspondence with the timing at which the pulsed laser light 32 that has traveled through the low-coherence optical system 4 passes through the discharge space 23.

Thereafter, the laser controller 220A may measure the time that has elapsed after the start of the transmission of the switch signal S5 using, for example, a timer or the like (not shown). The laser controller 220A may then stand by until the measured time exceeds or reaches the pre-set switch-on time ΔTpp (step S243; NO).

When the switch-on time ΔTpp has elapsed (step S243; YES), the laser controller 220A may end the transmission of the switch signal S5 (step S244). Through this, the period in which a discharge occurs in the discharge space 23 may be adjusted. Thereafter, the laser controller 220A may determine whether or not to end the operations (step S245). When the operations are to be ended (step S245; YES), the laser controller 220A may end the present operations. However, when the operations are not to be ended (step S245; NO), the process commanded by the laser controller 220A may return to step S241.

5.3 Effects

By operating as described thus far, the same effects as in the second embodiment can be achieved. Furthermore, in the third embodiment, when the optical shutters 41 through 44 carry out opening/closing operations in correspondence with the timing at which the pulsed laser light passes through the respective optical shutters 41 through 44, the optical shutters 41 through 44 can suppress self-oscillated light, returning light, and so on from the downstream side. In other words, the optical shutters 41 through 44 can achieve two functions (i.e. the suppression of self-oscillated light and returning light, and burst generation).

Note that the opening/closing operations illustrated in FIG. 8 may be combined with the opening/closing operations illustrated in FIG. 16. For example, the optical shutter 41 may carry out the opening/closing operations illustrated in FIG. 16, whereas the other optical shutters 42 through 44 may carry out the opening/closing operations illustrated in FIG. 8.

6. Master Oscillator Provided with Optical Axis Control Device of Pumping Laser (Fourth Embodiment)

Next, a laser system according to a fourth embodiment of this disclosure will be described in detail with reference to the drawings.

6.1 Configuration

Figure 22:
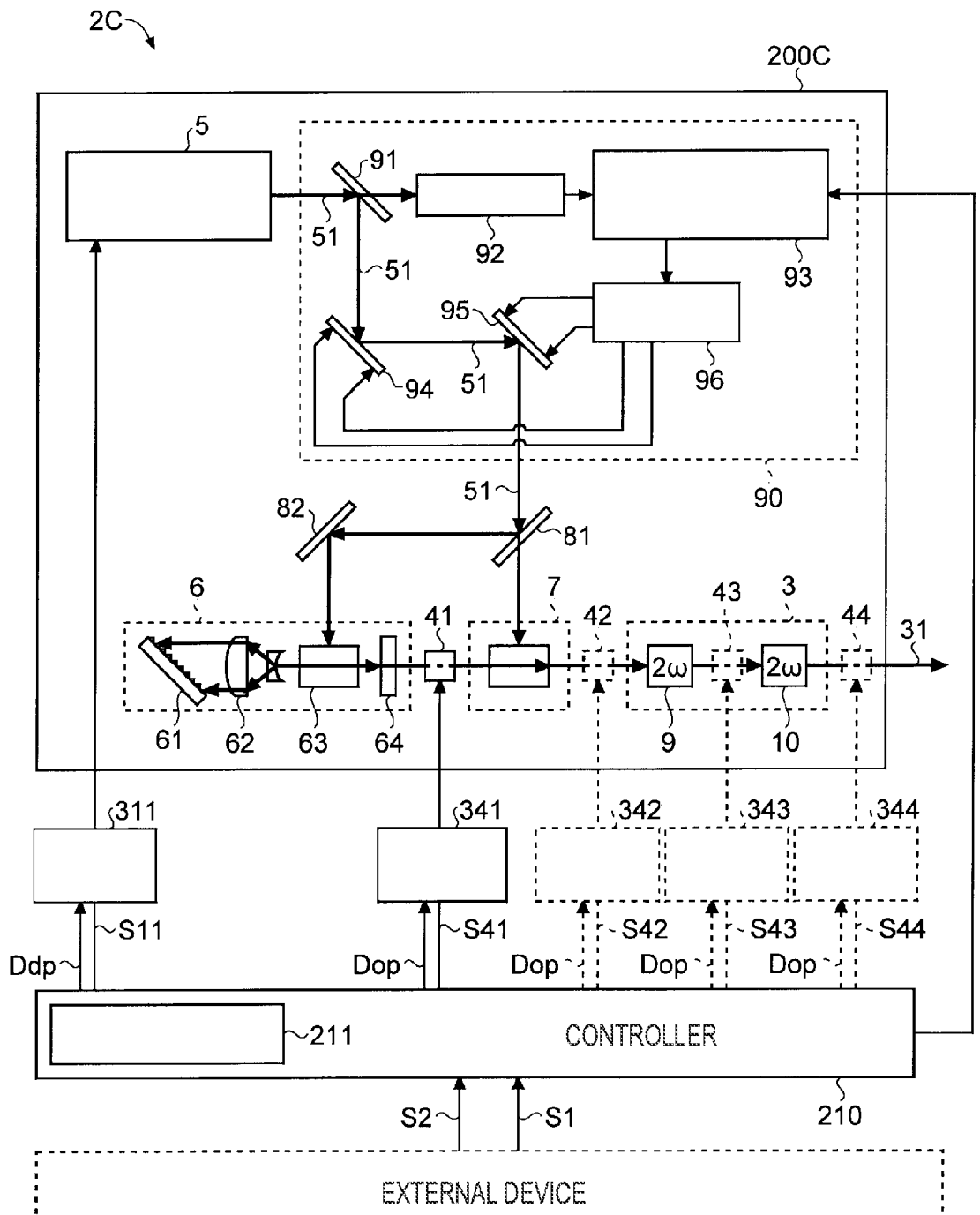
FIG. 22 schematically illustrates a master oscillator according to a fourth embodiment.

FIG. 22 schematically illustrates a master oscillator 2C according to the fourth embodiment of this disclosure. As shown in FIG. 22, the master oscillator 2C may include an optical axis control mechanism 90 that, for example, adjusts the optical axis of the pumping light 51 outputted from the pumping laser 5. The other components may be the same as, for example, the components of the master oscillator 2B illustrated in FIG. 14 except in the arrangements of the beam splitter 81 and the high-reflection mirror 82.

The optical axis control mechanism 90 may include a beam splitter 91, an optical axis sensor 92, an optical axis controller 93, two-axis tilt stage high-reflection mirrors 94 and 95, and a driver 96.

6.2 Operations

With the configuration illustrated in FIG. 22, the pumping light 51 outputted from the pumping laser 5 may be split between two paths by the beam splitter 91 of the optical axis control mechanism 90. Part of the pumping light 51 that has passed through the beam splitter 91 may enter the optical axis sensor 92. The optical axis sensor 92 may detect the optical axis of the pumping light 51 and input the detection result to the optical axis controller 93.

On the other hand, the pumping light 51 reflected by the beam splitter 91 may advance along an optical path between the high-reflection mirrors 94 and 95 provided with two-axis tilt stages, respectively. The high-reflection mirrors 94 and 95 provided with the respective two-axis tilt stages are capable of having the tilt angle of the mirror surface changed in two axial directions (a $\theta_x$ direction and a $\theta_y$ direction). Therefore, the optical axis of the pumping light 51 reflected by the high-reflection mirror 95 can be adjusted to a predetermined optical axis by adjusting the tilt of the mirror surfaces of the high-reflection mirrors 94 and 95.

When the detection result of the optical axis of the pumping light 51 by the optical axis sensor 92 has been inputted, the optical axis controller 93 may cause the driver 96 to operate based on the detection result. The driver 96 may, under the control of the optical axis controller 93, control the tilt of high-reflection mirrors 94 and 95. Through this, the optical axis of the pumping light 51 reflected by the high-reflection mirror 95 can be adjusted to a predetermined optical axis.

The pumping light 51 outputted from the optical axis control mechanism 90 may enter the beam splitter 81. The pumping light 51 reflected by the beam splitter 81 may be reflected by the high-reflection mirror 82 and may then enter the Ti: sapphire crystal within the Ti: sapphire laser 6. The pumping light 51 that has passed through the beam splitter 81 may enter the Ti: sapphire crystal within the amplifier 7.

6.3 Effects

Since the optical axis of the pumping light 51 entering the respective Ti: sapphire crystal is adjusted through the optical axis control mechanism 90, the energy efficiency in the Ti: sapphire laser 6 and the amplifier 7 can be improved. As a result, stable high-energy pulsed laser light can be generated efficiently.

Other configurations, operations, and the effects are the same as those described in the aforementioned embodiments, and thus detailed descriptions thereof will be omitted here.

7. Additional Descriptions

Next, additional descriptions of the various portions described in the aforementioned embodiments will be given.

7.1 Ti: Sapphire Laser (Seed Laser)

Figure 23:
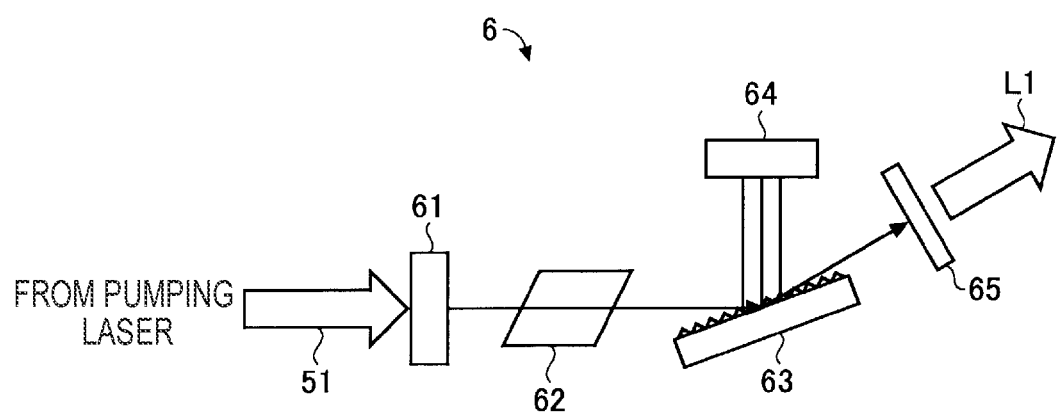
FIG. 23 illustrates an example of a Ti: sapphire laser according to the first through third embodiments.

FIG. 23 illustrates an example of the aforementioned Ti: sapphire laser 6. As shown in FIG. 23, the Ti: sapphire laser 6 may be what is known as a Littman-type laser. The Ti: sapphire laser 6 includes a high-reflection mirror 61, an output coupler 65, a Ti: sapphire crystal 62, a grating 63, and a high-reflection mirror 64. The high-reflection mirror 61 and the output coupler 65 jointly form an optical resonator. The Ti: sapphire crystal 62 and the grating 63 are disposed in the optical path of this optical resonator. The high-reflection mirror 64 reflects laser light diffracted by the grating 63 back toward the grating 63. The high-reflection mirrors 61 and 64 jointly form a resonator that is independent of the resonator formed by the high-reflection mirror 61 and the output coupler 65. The output coupler 65 also functions as an optical output terminal for outputting the pulsed laser light L1.

The high-reflection mirror 61 transmits the pumping light 51 from the pumping laser 5 but reflects the pulsed laser light from the Ti: sapphire crystal 62. The pumping light 51 inputted via the high-reflection mirror 61 enters the Ti: sapphire crystal 62. The optical input/output terminal surfaces of the Ti: sapphire crystal 62 are cut to a Brewster's angle. Through this, the reflection of laser light at these terminal surfaces is suppressed. The Ti: sapphire crystal 62 which the pumping light 51 has entered outputs the pulsed laser light L1 through oscillation using the energy obtained from the pumping light 51 that travels back and forth within the resonator. The pulsed laser light L1 emitted from the Ti: sapphire crystal 62 is diffracted by the grating 63. Here, the output coupler 65 is disposed relative to the grating 63 in, for example, the emission direction of zero-order diffracted light. In addition, the high-reflection mirror 64 is disposed relative to the grating 63 in the emission direction of ±m-order diffracted light. According to this configuration, by adjusting the angle of the high-reflection mirror 64 relative to the grating 63, the wavelength of the pulsed laser light L1 outputted by the Ti: sapphire laser 6 can be selected. As a result, it is possible to control the spectral line width of the pulsed laser light L1 outputted by the Ti: sapphire laser 6 to a spectral line width whose chromatic aberration can be ignored at the time of exposure.

7.2 Amplifier (Power Amplifier: PA)

Figure 24:
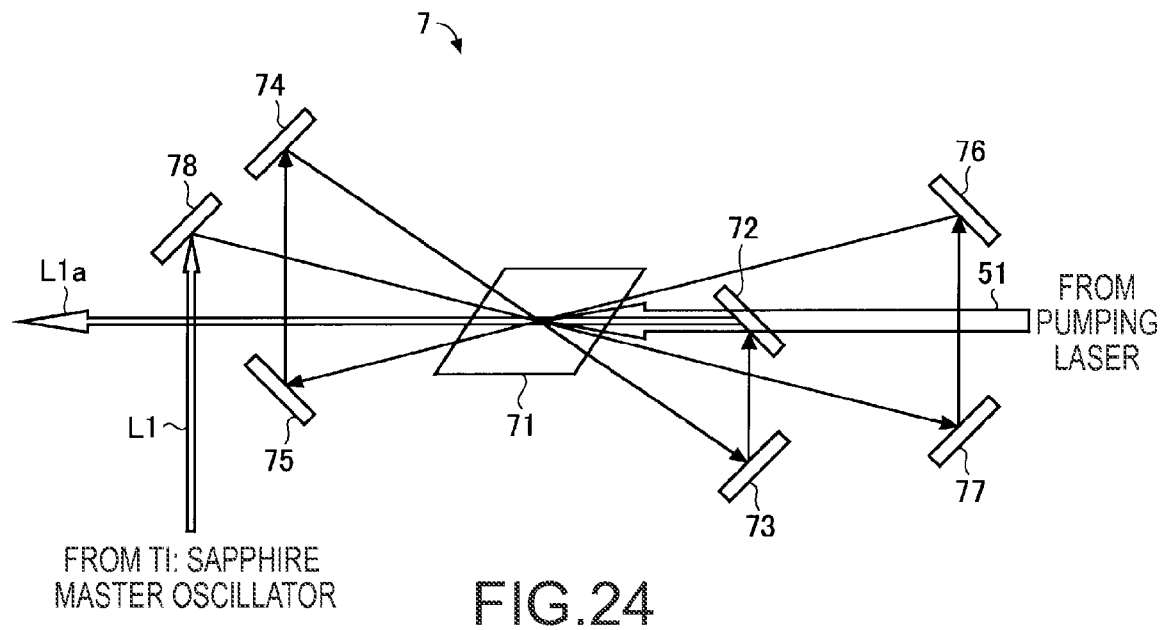
FIG. 24 illustrates an example of an amplifier according to the first through third embodiments.

FIG. 24 is a diagram illustrating an example of the aforementioned amplifier 7. Note that in this example, a multipass amplification-type power amplifier that does not include an optical resonator is given as an example. As shown in FIG. 24, the amplifier 7 includes a plurality of high-reflection mirrors 72 through 78 and a Ti: sapphire crystal 71. The plurality of high-reflection mirrors 72 through 78 form multiple passes so that the pulsed laser light L1 inputted from the Ti: sapphire laser 6 passes through the Ti: sapphire crystal 71 a plurality of times (in the present example, four times). The pumping light 51 from the pumping laser 5 enters the Ti: sapphire crystal 71 through the high-reflection mirror 72. The optical input/output terminal surfaces of the Ti: sapphire crystal 71 are cut to a Brewster's angle. The Ti: sapphire crystal 71 oscillates while obtaining energy from the pumping light 51 based on the pulsed laser light L1 that advances through the multiple passes. Through this, the pulsed laser light L1 undergoes multipass amplification with each of the plurality of passes. As a result, pulsed laser light L1a that has been amplified is emitted from the amplifier 7. Note that the high-reflection mirror 72 allows the pumping light 51 to pass but reflects the laser light from the Ti: sapphire crystal 71.

7.3 Alternative Example of Amplifier (Amplifier Including Optical Resonator (Power Oscillator): PO)

Figure 25:
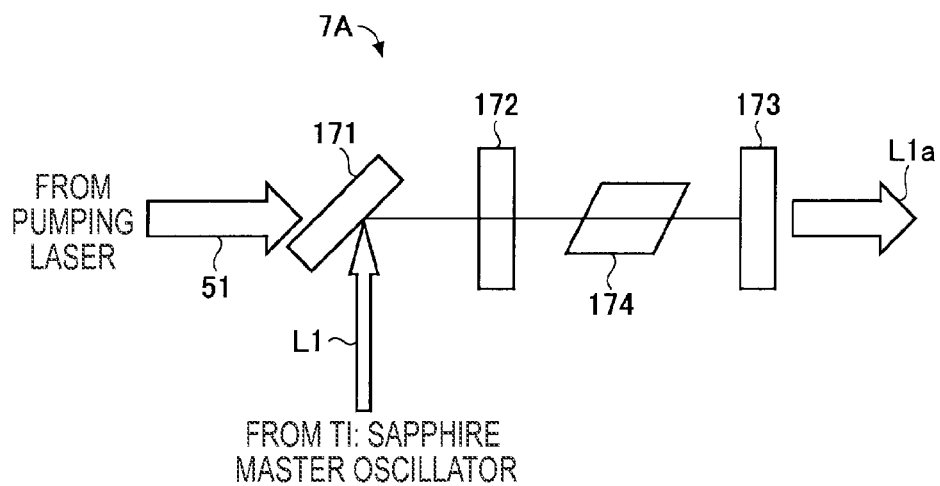
FIG. 25 schematically illustrates a Fabry-Perot amplifier according to the first through third embodiments.

It is also possible to replace the amplifier 7 with a power oscillator that includes an optical resonator therein. FIG. 25 schematically illustrates a Fabry-Perot amplifier 7A. As shown in FIG. 25, the amplifier 7A includes a high-reflection mirror 172, an output coupler 173, a Ti: sapphire crystal 174, and a high-reflection mirror 171. The high-reflection mirror 172 and the output coupler 173 jointly form an optical resonator. The Ti: sapphire crystal 174 is disposed in the optical path in this optical resonator. The high-reflection mirror 171 leads the pulsed laser light L1 entering from the Ti: sapphire laser 6 and the pumping light 51 entering from the pumping laser 5 into the optical resonator.

The high-reflection mirror 171 reflects the pulsed laser light L1 from the Ti: sapphire laser 6 toward the optical resonator, and transmits the pumping light 51 from the pumping laser 5 toward the optical resonator. The other high-reflection mirror 172 that form the optical resonator transmits the pulsed laser light L1 and the pumping light 51 and reflects laser light from the Ti: sapphire crystal 174. The optical input/output terminal surfaces of the Ti: sapphire crystal 174 are cut to a Brewster's angle. Through this, the reflection of laser light at these terminal surfaces is suppressed. By oscillating while obtaining energy from the pumping light 51 based on the pulsed laser light L1 that travels back and forth within the optical resonator, the Ti: sapphire crystal 174 emits amplified pulsed laser light L1a. The pulsed laser light L1a that has been amplified is outputted via the output coupler 173.

7.4 Optical Axis Control Mechanism

Next, an example of the optical axis control mechanism 90 illustrated in FIG. 22 will be described.

7.4.1 Optical Axis Sensor (Configuration Example 1)

Figure 26:
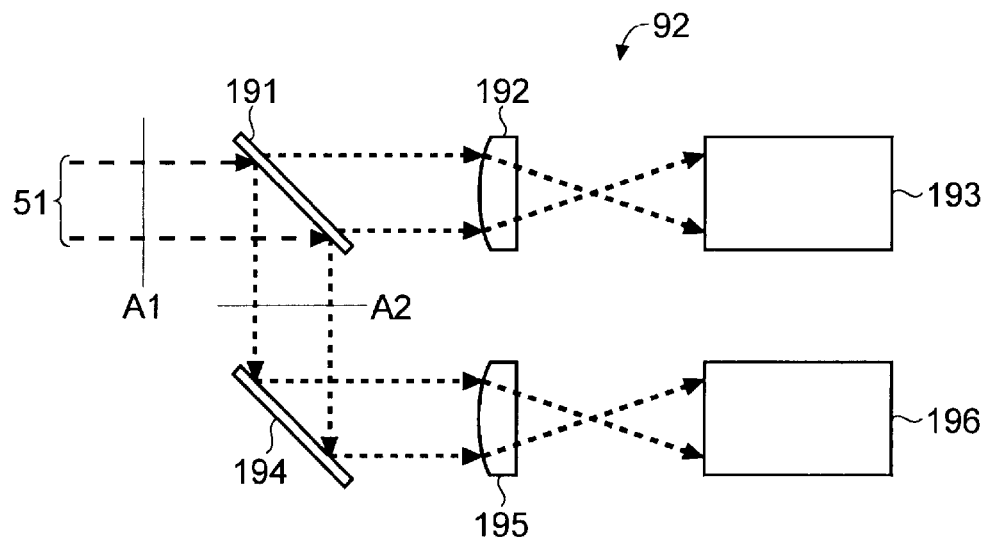
FIG. 26 illustrates an example (Configuration Example 1) of an optical axis sensor in an optical axis control mechanism according to the third embodiment.

FIG. 26 illustrates an example (Configuration Example 1) of the optical axis sensor 92 in the optical axis control mechanism 90. As shown in FIG. 26, the optical axis sensor 92 includes a beam splitter 191, a high-reflection mirror 194, lenses 192 and 195, and beamprofilers 193 and 196. A beam profile (a cross-sectional intensity profile of a laser beam) of the pumping light 51 at a position A1 on the beam transmission path is transferred on the photosensitive surface of the beam profiler 193 by the lens 192. On the other hand, a beam profile of the pumping light 51 at a position photosensitive surface of the beam profiler 196 by the lens 195. In this manner, beam profiles are measured at a plurality of different positions (A1 and A2), which makes it possible to calculate the direction (optical axis), the divergence (curvature factor of the wavefront), and so on of the pumping light 51. For example, the spatial positions of the beam transmission path and the direction of the beam transmission path can be calculated from the central positions of the beam profiles and the distance between the positions A1 and A2 on the beam transmission path. Furthermore, the divergence (curvature factor of the wavefront) of the pumping light 51 can be calculated from the difference in the sizes of the beam profiles at the positions A1 and A2.

7.4.2 Optical Axis Sensor (Configuration Example 2)

Figure 27:
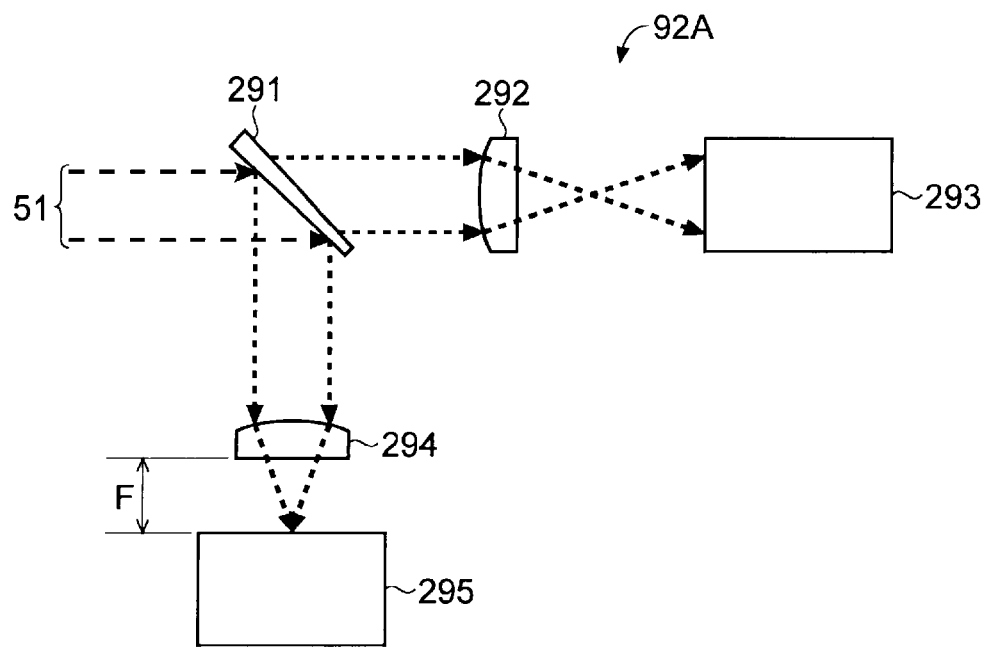
FIG. 27 illustrates another example (Configuration Example 2) of an optical axis sensor in an optical axis control mechanism according to the third embodiment.

The optical axis sensor 92 can also be modified as shown in FIG. 27. FIG. 27 illustrates another example (Configuration Example 2) of the optical axis sensor 92. As shown in FIG. 27, an optical axis sensor 92A includes a wedge beam splitter 291, lenses 292 and 294, and beam profilers 293 and 295. Like the lens 192 and the beam profiler 193 of the optical axis sensor 92, the lens 292 and the beam profiler 293 measure a beam profile of the pumping light 51 that has passed through the wedge beam splitter 291. On the other hand, the beam profiler 295 is disposed at the focal position of the lens 294. The beam profiler 295 measures a beam profile of the pumping light 51 reflected by the wedge beam splitter 291 at a focal position. The spatial position and direction of the pumping light 51 in the beam transmission path can be found from the central positions of the respective beam profiles and the focal distance of the lens 294. Furthermore, the divergence of the pumping light 51 can be found based on the sizes of the beam profiles and the measurement positions of the profilers.

7.4.3 Optical Axis Adjustment Unit (Two-Axis Tilt Stage Mirror)

Figure 28:
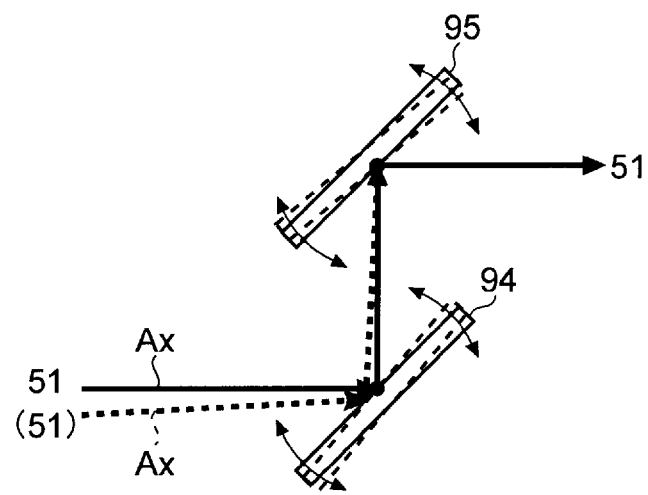
FIG. 28 illustrates an example of an optical axis adjustment unit according to the third embodiment.

The optical axis of the pumping light 51 can, as mentioned above, be adjusted using the high-reflection mirrors 94 and 95 provided with two-axis tilt stages, respectively. Here, the high-reflection mirrors 94 and 95 provided with the respective two-axis tilt stages are referred to as an optical axis adjustment unit. FIG. 28 illustrates an example of the optical axis adjustment unit. As shown in FIG. 28, the high-reflection mirrors 94 and 95 can adjust the beam transmission path of the pumping light 51 to a desired beam transmission path by controlling the respective orientation angles ($\theta_x$, $\theta_y$) thereof. Here, the directions of $\theta_x$ and $\theta_y$ may be orthogonal to each other.

Figure 29:
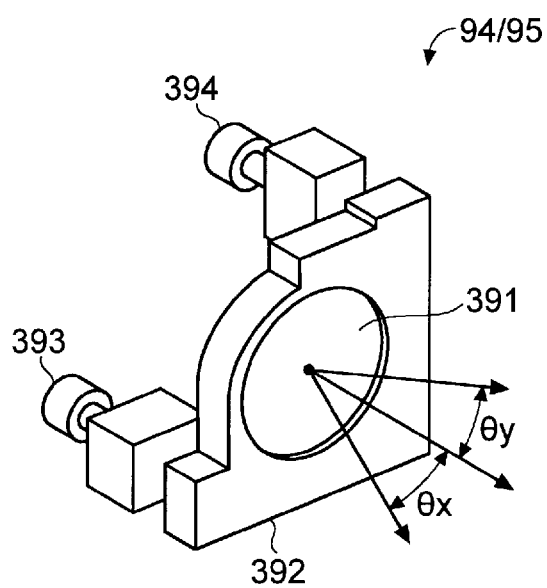
FIG. 29 illustrates an example of a mirror provided with a two-axis tilt stage according to the third embodiment.

Here, FIG. 29 illustrates an example of the high-reflection mirror 94 or 95. As shown in FIG. 29, the high-reflection mirror 94 or 95 includes a high-reflection mirror 391, a holder 392 that holds the high-reflection mirror 391, and two automatic micrometers 393 and 394, for example. By attaching the holder 392 to a predetermined plate via the automatic micrometers 393 and 394, the tilt angle $\theta_x$ in the X-axis direction and the tilt angle $\theta_y$ in the Y-axis direction of the high-reflection mirror 391 held by the holder 392 can be adjusted relative to the predetermined plate. Products on the market can be used as such a holder. For example, AG-M100NV6 manufactured by Newport Corporation may be used.

In this manner, the beam transmission path of the pumping light 51 can be corrected to a desired beam transmission path by controlling the orientation angles ($\theta_x$, $\theta_y$) of the high-reflection mirror 391. However, the configuration of the optical axis adjustment unit is not limited to the configuration shown in FIG. 29. For example, two wedge substrates through which the laser light passes may be disposed in the beam transmission path of the pumping light 51. In the case of such a configuration, the beam transmission path of the pumping light 51 can be adjusted to a desired beam transmission path by, for example, rotating the respective wedge substrates about the center axis of the beam transmission path. As described above, it is only necessary for the optical axis adjustment unit to include a mechanism capable of adjusting the beam transmission path of the pumping light 51 to a desired beam transmission path.

The above-described embodiments and the modifications thereof are merely examples for implementing this disclosure, and this disclosure is not limited thereto. Making various modifications according to the specifications or the like is within the scope of this disclosure, and other various embodiments are possible within the scope of this disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

Although the aforementioned embodiment describes an example in which there is one amplifier 7, a plurality of amplifiers 7 may be used. Furthermore, although the Ti: sapphire laser 6 and the amplifier 7 are pumped by a shared pumping laser 5, separate pumping lasers 5 may be used. In addition, a YLF laser or a $YBO_4$ laser may be used as the pumping laser 5. In addition, an erbium-doped fiber-optic laser may be used instead of the Ti: sapphire laser 6. At this time, the frequency of the light emitted from the erbium-doped fiber-optic laser may be doubled by a wavelength conversion element, before entering the amplifier 7. In addition, the erbium-doped fiber-optic laser may be pumped by a semiconductor laser. Furthermore, the wavelength conversion unit 8 is not limited to that described in this disclosure, but may be provided in any manner as long as the light entering the wavelength conversion unit 8 is converted into light having a wavelength in the gain bandwidth of the amplification device 3, such as, for example, a wavelength of approximately 193 nm. For example, a CLBO crystal may be used instead of the LBO crystal 9 as the wavelength conversion element included in the wavelength conversion unit 8.

What is claimed is:
1. A master oscillator comprising:
   a pumping laser that outputs pumping light;
   a seed laser that is oscillated by the pumping light;
   an amplifier that amplifies the pulsed laser light outputted by the seed laser using the pumping light;

at least one optical shutter disposed in an optical path between the seed laser and the amplifier; and a controller that causes the pumping laser to oscillate continuously at a predetermined repetition rate and that controls the optical shutter to open and close.

2. The master oscillator according to claim 1,
wherein the optical shutter comprises:
an electro-optical element;
a first optical filter disposed on an optical input end side of the electro-optical element;
a second optical filter disposed on an optical output end side of the electro-optical element; and
a power source that is connected to the electro-optical element, the power source applying a voltage to the electro-optical element.

3. The master oscillator according to claim 2, wherein the electro-optical element is a Pockels cell.

4. The master oscillator according to claim 2, wherein the first and second optical filters each include at least one polarizer.

5. The master oscillator according to claim 1,
wherein the controller generates a burst output of the pulsed laser light by controlling at least one of the optical shutters to open and close while the pumping laser is continuously oscillating.

6. A laser system comprising:
a master oscillator that outputs pulsed laser light; and
an amplification device that amplifies the pulsed laser light outputted from the master oscillator,
wherein the master oscillator comprises:
a pumping laser that outputs pumping light;
a seed laser that is oscillated by the pumping light;
a second amplifier that amplifies the pulsed laser light outputted by the seed laser using the pumping light;
at least one optical shutter disposed in an optical path between the seed laser and the second amplifier; and
a controller that causes the pumping laser to oscillate continuously at a predetermined repetition rate and that controls the optical shutter to open and close.

7. A laser generation method for an apparatus that comprises: a pumping laser that outputs pumping light; a seed laser that is oscillated by the pumping light; an amplifier that amplifies the pulsed laser light outputted by the seed laser using the pumping light; and at least one optical shutter disposed in an optical path between the seed laser and the amplifier, the method comprising:
continuously oscillating the pumping laser at a predetermined repetition rate; and
generating a burst output of said pulsed laser light by controlling said optical shutters to open and close while said pumping laser is continuously oscillating.

* * * * *